(12) United States Patent
Ballantine et al.

(10) Patent No.: US 12,385,145 B2
(45) Date of Patent: Aug. 12, 2025

(54) SYSTEMS AND METHODS FOR HYDROGEN RECOVERY

(71) Applicant: Ohmium International, Inc., Newark, CA (US)

(72) Inventors: Arne Ballantine, Incline Village, NV (US); Chockkalingam Karuppaiah, Fremont, CA (US); Rasool Aghatehrani, Redwood City, CA (US)

(73) Assignee: Ohmium International, Inc., Newark, CA (US)

( * ) Notice: Subject to any disclaimer, the term of this patent is extended or adjusted under 35 U.S.C. 154(b) by 199 days.

(21) Appl. No.: 17/864,187

(22) Filed: Jul. 13, 2022

(65) Prior Publication Data
US 2023/0015026 A1    Jan. 19, 2023

Related U.S. Application Data

(60) Provisional application No. 63/221,664, filed on Jul. 14, 2021.

(30) Foreign Application Priority Data

Jul. 7, 2022 (TW) .................................. 111125595

(51) Int. Cl.
*C25B 1/02* (2006.01)
*B01D 53/26* (2006.01)
*C01B 3/50* (2006.01)

(52) U.S. Cl.
CPC .............. *C25B 1/02* (2013.01); *B01D 53/26* (2013.01); *C01B 3/50* (2013.01); *B01D 2257/80* (2013.01)

(58) Field of Classification Search
None
See application file for complete search history.

(56) References Cited

U.S. PATENT DOCUMENTS

| | | | |
|---|---|---|---|
| 5,980,726 | A | 11/1999 | Moulthrop, Jr. et al. |
| 6,159,629 | A | 12/2000 | Gibb et al. |
| 8,440,362 | B2 | 5/2013 | Richards et al. |
| 8,669,499 | B2 | 3/2014 | Conrad |
| 9,452,388 | B2 | 9/2016 | Kelly |
| 9,452,401 | B2 | 9/2016 | Kelly et al. |

(Continued)

FOREIGN PATENT DOCUMENTS

| | | |
|---|---|---|
| CN | 102264950 A | 11/2011 |
| CN | 105036254 | 11/2015 |

(Continued)

OTHER PUBLICATIONS

U.S. Appl. No. 17/949,856, Arne Ballantine, Electrochemical Devices, Modules, and Systems for Hydrogen Generation and Methods of Operating Thereof, filed Sep. 21, 2022.

(Continued)

*Primary Examiner* — Duane Smith
(74) *Attorney, Agent, or Firm* — Polsinelli LLP

(57) ABSTRACT

A system for hydrogen recovery includes a dryer having an inlet that may be fluidly connected to a hydrogen outlet of a hydrogen generator, a hydrogen using device having an inlet fluidly connected to a dry hydrogen outlet of the dryer, and one or more conduits fluidly connecting a wet hydrogen outlet from the dryer and an impure hydrogen exhaust outlet of the hydrogen using device to the inlet of the dryer.

13 Claims, 9 Drawing Sheets

(56) References Cited

U.S. PATENT DOCUMENTS

| | | | |
|---|---|---|---|
| D822,630 S | 7/2018 | Zheng et al. | |
| D864,111 S | 10/2019 | Gleave et al. | |
| D909,297 S | 2/2021 | Yoshizumi et al. | |
| 11,005,117 B2 | 5/2021 | Seymour et al. | |
| D958,745 S | 7/2022 | Zheng et al. | |
| 11,492,711 B2 | 11/2022 | Ballantine | |
| 11,767,599 B2 | 9/2023 | Ballantine et al. | |
| 11,767,603 B2 | 9/2023 | Ballantine et al. | |
| D1,001,738 S | 10/2023 | Wang | |
| D1,003,244 S | 10/2023 | Yan | |
| D1,020,669 S | 4/2024 | Zhuang et al. | |
| D1,028,914 S | 5/2024 | Belcastro et al. | |
| 2002/0017463 A1 | 2/2002 | Merida-Donis | |
| 2002/0090868 A1* | 7/2002 | Schmitman | C25B 1/04 440/113 |
| 2004/0045815 A1 | 3/2004 | Tseng et al. | |
| 2004/0224192 A1 | 11/2004 | Pearson | |
| 2005/0074657 A1* | 4/2005 | Rusta-Sallehy | H01M 8/0656 429/418 |
| 2005/0181244 A1 | 8/2005 | Porter et al. | |
| 2007/0065711 A1 | 3/2007 | Gopal | |
| 2007/0082239 A1 | 4/2007 | Shiroma et al. | |
| 2008/0241612 A1 | 10/2008 | Ballantine et al. | |
| 2008/0318089 A1 | 12/2008 | Schneider et al. | |
| 2009/0123783 A1* | 5/2009 | Schrieber | C25B 1/02 429/432 |
| 2009/0255826 A1* | 10/2009 | McWhinney | C25B 1/04 204/266 |
| 2010/0236921 A1 | 9/2010 | Yang | |
| 2011/0146599 A1* | 6/2011 | Sciban | C25B 1/04 123/3 |
| 2011/0155583 A1 | 6/2011 | Li | |
| 2011/0259758 A1 | 10/2011 | Sioli et al. | |
| 2012/0031772 A1* | 2/2012 | Dean | C25B 1/04 205/637 |
| 2012/0088183 A1 | 4/2012 | Suenaga et al. | |
| 2013/0093194 A1 | 4/2013 | Barbachano et al. | |
| 2013/0264195 A1 | 10/2013 | Zhou et al. | |
| 2015/0073632 A1 | 3/2015 | Hill | |
| 2015/0162632 A1 | 6/2015 | Gottmann et al. | |
| 2015/0360941 A1 | 12/2015 | Macrae | |
| 2016/0002798 A1 | 1/2016 | Rømer et al. | |
| 2016/0068976 A1 | 3/2016 | Yoshida et al. | |
| 2016/0079613 A1 | 3/2016 | Gurunathan et al. | |
| 2017/0050867 A1 | 2/2017 | Kang et al. | |
| 2019/0194042 A1 | 6/2019 | Mohri et al. | |
| 2020/0010961 A1 | 1/2020 | Kazuno et al. | |
| 2021/0156038 A1 | 5/2021 | Ballantine | |
| 2021/0156039 A1 | 5/2021 | Ballantine | |
| 2021/0336284 A1 | 10/2021 | Seymour et al. | |
| 2022/0131165 A1 | 4/2022 | Ballantine et al. | |
| 2023/0019611 A1 | 1/2023 | Ballantine | |
| 2023/0021049 A1 | 1/2023 | Ballantine | |
| 2023/0272543 A1 | 8/2023 | Ballantine et al. | |
| 2024/0072285 A1 | 2/2024 | Ballantine et al. | |
| 2024/0150909 A1 | 5/2024 | Ballantine et al. | |

FOREIGN PATENT DOCUMENTS

| | | |
|---|---|---|
| CN | 206872952 | 1/2018 |
| CN | 109338394 | 2/2019 |
| CN | 211496938 | 9/2020 |
| CN | 112619384 | 4/2021 |
| CN | 213679817 | 7/2021 |
| CN | 308303597 | 11/2023 |
| DE | 102019217114 | 5/2021 |
| EP | 2623640 | 1/2019 |
| EP | 4061984 | 9/2022 |
| EP | 4061985 | 9/2022 |
| EP | 4370467 A1 | 5/2024 |
| EP | 4581193 | 7/2025 |
| GB | 211946 A | 2/1924 |
| IN | 385947-001 | 5/2024 |
| IN | 554612 | 11/2024 |
| JP | 2007031813 A | 2/2007 |
| JP | 2016526608 A | 9/2016 |
| JP | 2019112683 A | 7/2019 |
| JP | 2023502525 A | 1/2023 |
| JP | 2023502781 A | 1/2023 |
| JP | 2024-526688 | 7/2024 |
| JP | 2025-071197 | 5/2025 |
| JP | 7699126 | 6/2025 |
| KR | 100406933 B1 | 12/2003 |
| KR | 102017328 | 9/2019 |
| TW | I229655 | 3/2005 |
| TW | 202132623 A | 9/2021 |
| TW | 202313453 | 4/2023 |
| TW | I874502 | 3/2025 |
| WO | WO 2010/048706 | 5/2010 |
| WO | 2013152422 A1 | 10/2013 |
| WO | 2018236649 A1 | 12/2018 |
| WO | WO 2021/102401 | 5/2021 |
| WO | WO 2021/102405 | 5/2021 |
| WO | WO 2023/287905 | 1/2023 |
| WO | 2024049837 A2 | 3/2024 |
| WO | 2024102844 A1 | 5/2024 |

OTHER PUBLICATIONS

U.S. Appl. No. 17/943,584, Arne Ballantine, Electrochemical Devices, Modules, and Systems for Hydrogen Generation and Methods of Operating Thereof, filed Sep. 13, 2022.

PCT/US2022/03699, Systems and Methods for Hydrogen Recovery, Jul. 13, 2022.

PCT Application No. PCT/US2022/036999, International Preliminary Report on Patentability dated Jan. 25, 24.

PCT Application No. PCT/US2023/031419, Invitation to Pay Additional Fees dated Nov. 22, 23.

Chisholm, G. et al., "3D printed flow plates for the electrolysis of water: an economic and adaptable approach to device manufacture," Energy Environmental Science, vol. 7, pp. 3026-3032, Jul. 2014.

PCT Application No. PCT/US2020/061771, International Preliminary Report on Patentability dated May 17, 2022.

PCT Application No. PCT/US2020/061771, International Search Report and Written Opinion dated May 7, 2021.

PCT Application No. PCT/US2020/061776, International Preliminary Report on Patentability dated May 17, 2022.

PCT Application No. PCT/US2020/061776, International Search Report and Written Opinion dated Apr. 2, 2021.

U.S. Appl. No. 18/504,899, Arne Ballantine, Modular Systems for Hydrogen Generation and Methods of Operating Threof, filed Nov. 8, 2023.

U.S. Appl. No. 17/949,856, Notice of Allowance dated Jul. 24, 2023.

U.S. Appl. No. 17/101,251, Notice of Allowance dated Jun. 5, 2023.

U.S. Appl. No. 18/144,614, Arne Ballantine, Modular Systems for Hydrogen Generation and Methods of Operating Thereof, filed May 8, 2023.

U.S. Appl. No. 18/239,540, Arne Ballantine, Energy Storing Electricity Generator, filed Aug. 29, 2023.

U.S. Appl. No. 29/859,703, Arne Ballantine, Electrolyzer Cabinet, filed Nov. 11, 2022.

U.S. Appl. No. 18/368,440, Arne Ballantine, Hydrogen Compressor Integration Into Hydrogen Plant, filed Sep. 14, 2023.

U.S. Appl. No. 29/859,700, Arne Ballantine, Electrolyzer Cabinet, filed Nov. 11, 2022.

PCT Application No. PCT/US2022/036999, International Search Report and Written Opinion dated Nov. 23, 2022.

PCT Application No. PCT/US2023/079135, International Search Report and Written Opinion dated Mar. 22, 2024.

TW Application No. 109141028, Office Action dated Nov. 6, 2024.

U.S. Appl. No. 29/859,703, Office Action dated Sep. 5, 2024.

U.S. Appl. No. 29/859,703, Office Action dated Aug. 30, 2024.

EP Application No. 20890018.3, Extended Search Report dated Jun. 28, 2024.

EP Application No. 20890603.2, Supplementary Search Report dated Jul. 17, 2024.

(56) References Cited

OTHER PUBLICATIONS

IN Application No. 109141028, Examination Report dated Aug. 8, 2024.
JP Application No. 2022-530195, Office Action dated Nov. 25, 2024.
JP Application No. 2022-530251, Office Action dated Nov. 26, 2024.
ETN News: Ohmium to supply 120 MW PEM Electrolyzers to NovoHydrogen for US power plant, dated Nov. 20, 2022, Available from Internet, URL: https://etn.news/buzz/ohmium-pem-electrolyzers-novohydrogen-newjersey-power-plant.
Youtube: Ohmium International—Humanizing energy, dated Jun. 20, 2023, Available from Internet, URL: https://www.youtube.com/watch?v=JN-4bjTSglg.
U.S. Appl. No. 29/937,239, Selvakumar Srinivasaperumal, Electrolyzer Cabinet, filed Apr. 12, 2024.
U.S. Appl. No. 29/859,257, Palani Kumar Sevugan, Cooling Cabinet, filed Apr. 12, 2024.
PCT Application No. PCT/US2023/031419, International Search Report and Written Opinion dated Apr. 5, 2024.
PCT Application No. PCT/US2023/031419, International Preliminary Report on Patentability dated Mar. 13, 2025.
U.S. Appl. No. 17/949,856, Office Action dated Mar. 30, 2023.
UAE Application No. P6000937/2022, Office Action dated Dec. 14, 2024.
CL Design Application No. 2023-01357, Technical Office Action dated Nov. 13, 2024.
CL Design Application No. 2023-01358, Technical Office Action dated Nov. 13, 2024.
EP Application No. 20890603.2, Extended European Search Report dated Oct. 29, 2024.
TH Design Application No. 2302001822, Office Action dated Nov. 11, 2024.
TH Design Application No. 2302001827, Office Action dated Oct. 23, 2023.
U.S. Appl. No. 17/943,584, Office Action dated Jun. 17, 2025.
PCT Application No. PCT/US2023/079135, International Preliminary Report on Patentability dated May 22, 2025.
EP Application No. 22842821.5, Extended European Search Report dated Jun. 11, 2025.

* cited by examiner

SYSTEMS AND METHODS FOR HYDROGEN RECOVERY

CROSS-REFERENCE TO RELATED APPLICATIONS

This application claims priority to TW Application No. 111125595 entitled "SYSTEMS AND METHODS FOR HYDROGEN RECOVERY", filed Jul. 7, 2022, and also claims priority to U.S. Provisional Application No. 63/221,664 entitled "ELECTROLYZER SYSTEM WITH HYDROGEN RECOVERY" filed Jul. 14, 2021, the entire contents of which are incorporated by reference herein.

FIELD

The present disclosure is directed to chemical production in general and, more specifically, to systems for hydrogen recovery.

BACKGROUND

Hydrogen is a common gas that has many industrial uses, such as petroleum refining, metal treatment, food processing, and ammonia production. Although hydrogen is abundant and can be formed from a variety of renewable and non-renewable energy sources, the combustibility of hydrogen in air makes hydrogen difficult to store and ship. As a result, hydrogen is generally not amenable to large-scale production at a centralized facility for subsequent distribution across large geographical regions. Rather, hydrogen is generally used at or near the site of its production.

Co-locating hydrogen production with its ultimate industrial use can present challenges related to plant footprint, safety, and resource availability. Accordingly, there remains a need for hydrogen generation that can be carried out cost-effectively in small footprint plants that are amenable to safe implementation in a wide range of locations, including resource-constrained areas.

SUMMARY

Provided herein is a system for hydrogen recovery. The system a dryer comprising an inlet that may be fluidly connected or operably connected to a hydrogen generator, and a hydrogen-using application comprising an inlet fluidly connected to a dry hydrogen outlet of the dryer and an outlet fluidly connected to the inlet of the dryer. In some embodiments, the hydrogen generator comprises an electrolyzer stack. In preferred embodiments, the inlet of the dryer is fluidly connected to the hydrogen generator.

In some embodiments, the system comprises one or more pumps. In some aspects, each of the pumps comprises an inlet fluidly connected to the hydrogen-using application and an outlet fluidly connected to the inlet of the dryer. In some additional aspects, the dryer further comprises a wet hydrogen outlet fluidly connected to the inlet of at least one of the one or more pumps.

In some embodiments, the system comprises one or more humidifiers. In some aspects, each of the one or more humidifiers comprising an inlet and an outlet, the outlet fluidly connected to the one or more pumps.

In some embodiments, the system comprises a purifier. In some aspects, the purifier comprises an inlet fluidly connected to the dry hydrogen outlet of the dryer and an outlet fluidly connected to the inlet of the hydrogen-using application.

In some embodiments, the system further comprises at least one oxygen sensor.

In some embodiments, the dryer further comprises a wet hydrogen outlet fluidly connected to the inlet of the dryer.

In some embodiments, the system further comprises a blending tank. In some aspects, the blending tank comprises an inlet fluidly connected to the outlet of the hydrogen-using application.

Further provided herein are methods for generating and recovering hydrogen. The method comprises providing a wet hydrogen stream from a hydrogen generator to an inlet of a dryer, outputting a dry hydrogen stream from a first outlet of the dryer to a hydrogen-using application, providing a purge wet hydrogen stream from a second outlet of the dryer to the inlet of the dryer, and providing an exhaust hydrogen stream from the hydrogen-using application to the inlet of the dryer. In some embodiments, the hydrogen generator comprises an electrolyzer stack.

In some embodiments, providing the exhaust hydrogen stream from the hydrogen-using application to the inlet of the dryer may be accomplished by one or more pumps.

In some embodiments, the method further comprises humidifying the exhaust hydrogen stream from the hydrogen-using application before providing the exhaust hydrogen stream from the hydrogen-using application to the inlet of the dryer.

In some embodiments, the method further comprises purifying the dry hydrogen stream from the first outlet of the dryer before outputting the dry hydrogen stream from the first outlet of the dryer to the hydrogen-using application. In some aspects, the purifying is accomplished via a purifier. In some exemplary embodiments, the method further comprises humidifying a purge wet hydrogen stream from an outlet of the purifier.

In some embodiments, the method further comprises combining the exhaust hydrogen stream from the hydrogen-using application and the purge wet hydrogen stream form the second outlet of the dryer prior to providing the exhaust hydrogen stream from the hydrogen-using application and the purge wet hydrogen stream from the second outlet of the dryer to the inlet of the dryer. In some aspects, the combining is accomplished via a blending tank. In some further aspects, the method further comprises humidifying the combined exhaust hydrogen stream from the hydrogen-using application and the purge wet hydrogen stream from the second outlet of the dryer prior to providing the exhaust hydrogen stream from the hydrogen-using application and the purge wet hydrogen stream from the second outlet of the dryer to the inlet of the dryer.

BRIEF DESCRIPTION OF THE FIGURES

Like reference symbols in the various drawings indicate like elements.

DETAILED DESCRIPTION

Figure 1A:
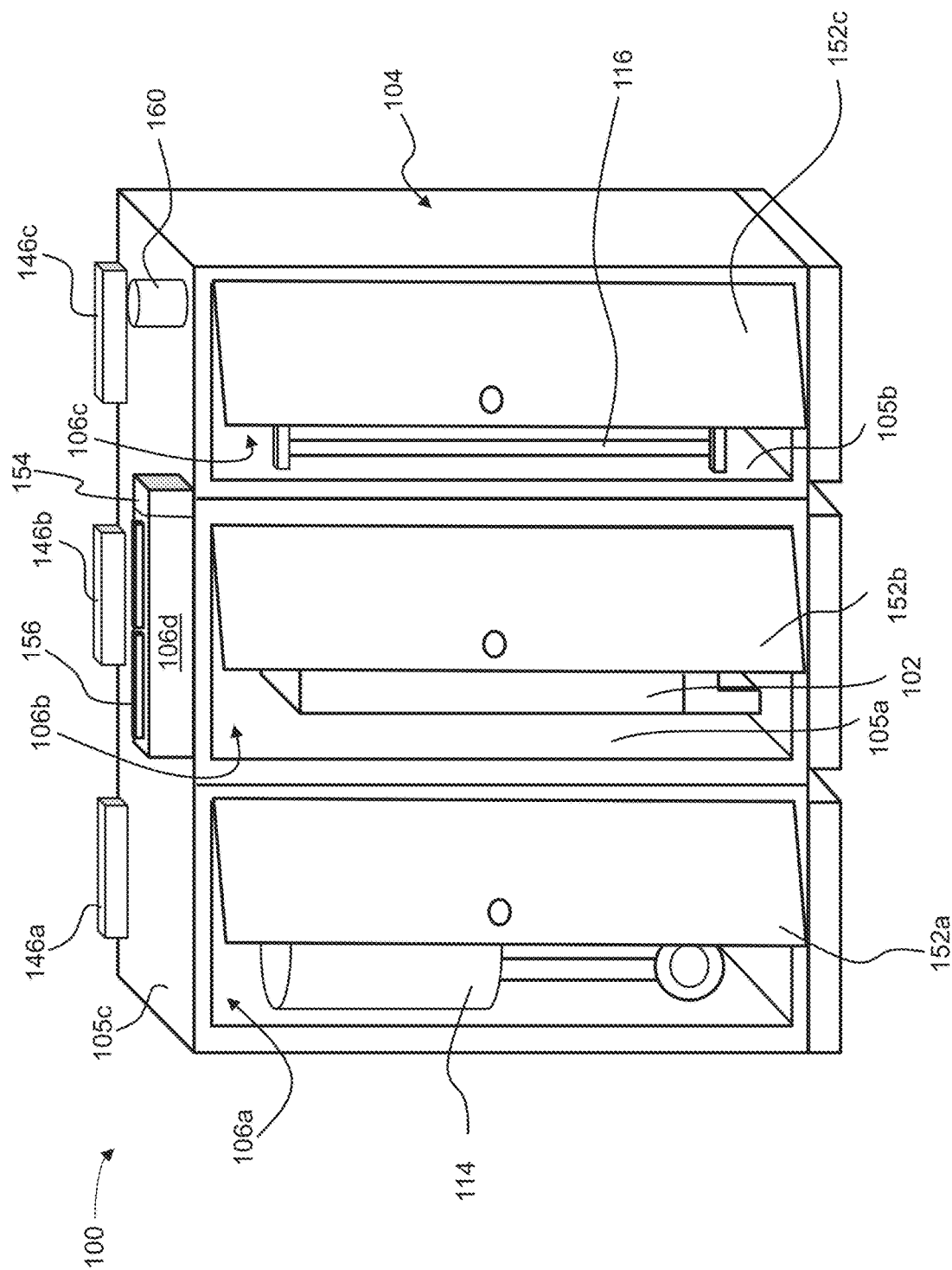
FIG. 1A is a perspective view of a system including a cabinet and an electrochemical module.

Provided herein are systems for recovering hydrogen in a hydrogen generation system. The systems of the present disclosure generally comprise a hydrogen generator, a dryer, and a hydrogen-using application. The hydrogen-using application may be any hydrogen-using device or process, such as a glass float furnace, a metals furnace, or other processes devices requiring hydrogen. In some embodiments, the system may comprise a plurality of hydrogen-using applications. Once the hydrogen is used by the hydrogen-using application, the exhaust hydrogen is recycled back into the system for purification and further use, thereby increasing the overall efficiency of the system.

The hydrogen generator may comprise any device or system capable of generating hydrogen gas. The hydrogen generator may comprise an electrolyzer stack, a steam methane reformer, a methane pyrolysis system, a plasma reforming system, or other devices and systems known in the art for producing hydrogen. In some embodiments, the system of the present disclosure may comprise more than one hydrogen generator.

Preferably, the hydrogen generator comprises an electrolyzer stack. The electrolyzer stack may be any electrolyzer stack known in the art capable of producing hydrogen from water. Generally, the electrolyzer stack comprises an inlet fluidly connected to a water source (e.g., tap water, distilled water, etc.), which is operable to receive water. The electrolyzer stack further comprises an outlet fluidly connected to an inlet of a dryer. A stream of wet hydrogen flows from the electrolyzer outlet to the to the inlet of the dryer. Those having skill in the art will appreciate that the moisture content of the wet hydrogen flowing from the electrolyzer will depend on the parameters of the electrolyzer, the pressure of the hydrogen stream, the temperature of the hydrogen stream, and the partial pressure of the wet hydrogen as compared to the total pressure of the system. As a non-limiting example, a wet hydrogen stream exiting the electrolyzer stack at 40° C., the moisture content of the wet hydrogen may be about 2 mol %. Preferred electrolyzer stacks for use in the systems of the present disclosure are described in more detail below and in U.S. application Ser. No. 17/101,232 entitled "ELECTROCHEMICAL DEVICES, MODULES, AND SYSTEMS FOR HYDROGEN GENERATION AND METHODS OF OPERATING THEREOF" filed on Nov. 23, 2020, the entire contents of which are incorporated by reference herein.

The dryer is operable to separate water from a wet hydrogen stream, thereby forming a dry hydrogen stream. Dryers suitable for drying the wet hydrogen stream are well-known by those having ordinary skill in the art, and may include dehumidifiers or other heat exchangers known in the art. The dryer comprises an inlet that is capable of being fluidly connected or operable connected to the hydrogen generator, and an outlet fluidly connected to a hydrogen-using application. In preferred embodiments, the inlet is fluidly connected and/or operably connected to the hydrogen generator. The outlet fluidly connected to the hydrogen-using application is operable to deliver a dry hydrogen stream to the hydrogen-using application; therefore, the outlet comprises dry hydrogen. In some embodiments, the system may comprise a plurality of dryers connected in parallel.

The dryer may further comprise a second outlet operable to deliver a purge wet hydrogen stream from the dryer. The purge wet hydrogen stream may be fluidly connected to the inlet of the dryer, a pump, to a blending tank, or to another unit in the system.

The system may further comprise a purifier to remove more water and other impurities from the hydrogen, thereby providing a purified hydrogen stream. The purifier may comprise an inlet that may be fluidly connected to the outlet of the dryer. The purifier may further comprise a first outlet that is fluidly connected to the inlet of the hydrogen-using application. The first outlet from the purifier comprises purified hydrogen. The purifier may further comprise a second outlet that is fluidly connected to a blending tank, a pump, a humidifier, and/or another process unit requiring a wet hydrogen stream. The second outlet of the purifier comprises a purge wet hydrogen stream. In some embodiments, the system may comprise a plurality of purifiers connected in parallel. The purifier may include a pressure swing adsorption purifier, a palladium diffuser, a PEM electrolyzer purifier, a silica desiccant purifier, or other hydrogen purification methods known in the art. In preferred embodiments, the purifier comprises a pressure swing adsorption purifier.

The system may further comprise one or more pumps to increase the pressure of the hydrogen exhaust stream from the hydrogen-using application before the hydrogen enters the inlet to the dryer. The one or more pumps may be any pumps or compressors known in the art operable to increase the pressure of the hydrogen. Preferably, the one or more pumps comprises an electrochemical pump, such as a proton exchange membrane disposed between an anode and a cathode. The pump may produce a wet hydrogen stream and a purge water stream.

The system may further comprise one or more humidifiers. Additionally, some electrochemical hydrogen pumps and driers may require humidified hydrogen for proper function. The humidifiers may be operable to add water to the hydrogen exhaust stream from the hydrogen-using application prior to recycling the hydrogen back into the inlet of the dryer. Preferably, the one or more humidifiers is fluidly connected to one or more pumps such as electrochemical hydrogen pumps. Each humidifier may comprise an inlet and an outlet. The inlet of the humidifier may be fluidly connected to the purifier, the exhaust hydrogen stream from the application, or to another process unit comprising a dry or purified hydrogen stream. The outlet of the humidifier comprises wet hydrogen. The outlet of the humidifier may be fluidly connected to a pump, to the inlet of the dryer, or to another process unit requiring a wet hydrogen stream.

The system may further comprise an oxygen sensor. The oxygen sensor is operable to detect the concentration of oxygen in a hydrogen stream. The oxygen sensor may be operably connected to a valve and a controller, wherein when an abnormal level of oxygen is detected the controller may automatically close the valve to stop the gas flow. Alternatively, or additionally, the oxygen-rich gas stream may be purged, scrubbed, or vented to the environment to remove the oxygen from the system. In some embodiments, the system may comprise a plurality of oxygen sensors located throughout the system to monitor the flow of oxygen through the system.

The system may further comprise a blending tank. The blending tank is operable to combine various streams of hydrogen into a homogeneous stream. Blending tanks are generally known in the art, and may include static mixers, in-line mixers, mixing tanks, etc. The blending tank may comprise an inlet fluidly connected to the exhaust hydrogen stream from the hydrogen-using application, the purge wet hydrogen stream from the dryer, the purge wet hydrogen stream from the purifier, and/or another process unit. The outlet of the blending tank may be fluidly connected to a humidifier, a pump, or another process unit. In some embodiments, the system may comprise a plurality of blending tanks.

The systems will now be described more fully hereinafter with reference to the accompanying figures, in which exemplary embodiments are shown. The foregoing may, however, be embodied in many different forms and should not be construed as limited to the exemplary embodiments set forth herein. All fluid flows may flow through conduits (e.g., pipes and/or manifolds) unless specified otherwise. It will be appreciated by those having ordinary skill in the art that valves, sensors, and other instrumentation may be included in any of the systems described herein.

In the description that follows, various aspects of electrochemical devices, modules, and systems are described in the context of electrochemical electrolysis of hydrogen from water and electricity with separately ventilated cabinet sections (i.e., spaces) for electrolysis (i.e., electrolyzer stack location), oxygen processing and hydrogen processing. This configuration increases the system safety by separating oxygen and hydrogen processing equipment into separately ventilated spaces to reduce the likelihood of mixing and exothermic reaction between leaking oxygen and hydrogen.

Nevertheless, unless otherwise specified or made clear from the context, it shall be understood that any one or more of the various different devices, modules, or systems described herein may be additionally, or alternatively, used in any one or more of various different electrochemical processes in which a lower pressure reactant is an input to an electrochemical process that produces a higher-pressure product. For example, unless a contrary intent is indicated, any one or more of the various different devices, modules, and systems described herein may be used to electrochemically pump hydrogen, as may be useful for recirculating hydrogen to increase the overall yield of a chemical process. As a more specific example, any one or more of the various different devices, modules, and systems described herein may be used to generate hydrogen and/or recirculate hydrogen for ammonia synthesis as part of any one or more of the various systems and methods described in U.S. patent application Ser. No. 17/101,224 entitled "SYSTEMS AND METHODS OF AMMONIA SYNTHESIS" filed Nov. 23, 2020, and U.S. patent application Ser. No. 17/101,232 entitled "ELECTROCHEMICAL DEVICES, MODULES, AND SYSTEMS FOR HYDROGEN GENERATION AND METHODS OF OPERATING THEREOF," filed Nov. 23, 2020, and U.S. patent application Ser. No. 17/101,251 entitled "MODULAR SYSTEMS FOR HYDROGEN GENERATION AND METHODS OF OPERATING THEREOF" filed Nov. 23, 2020, the entire contents of each of which are incorporated herein by reference.

Figure 1B:
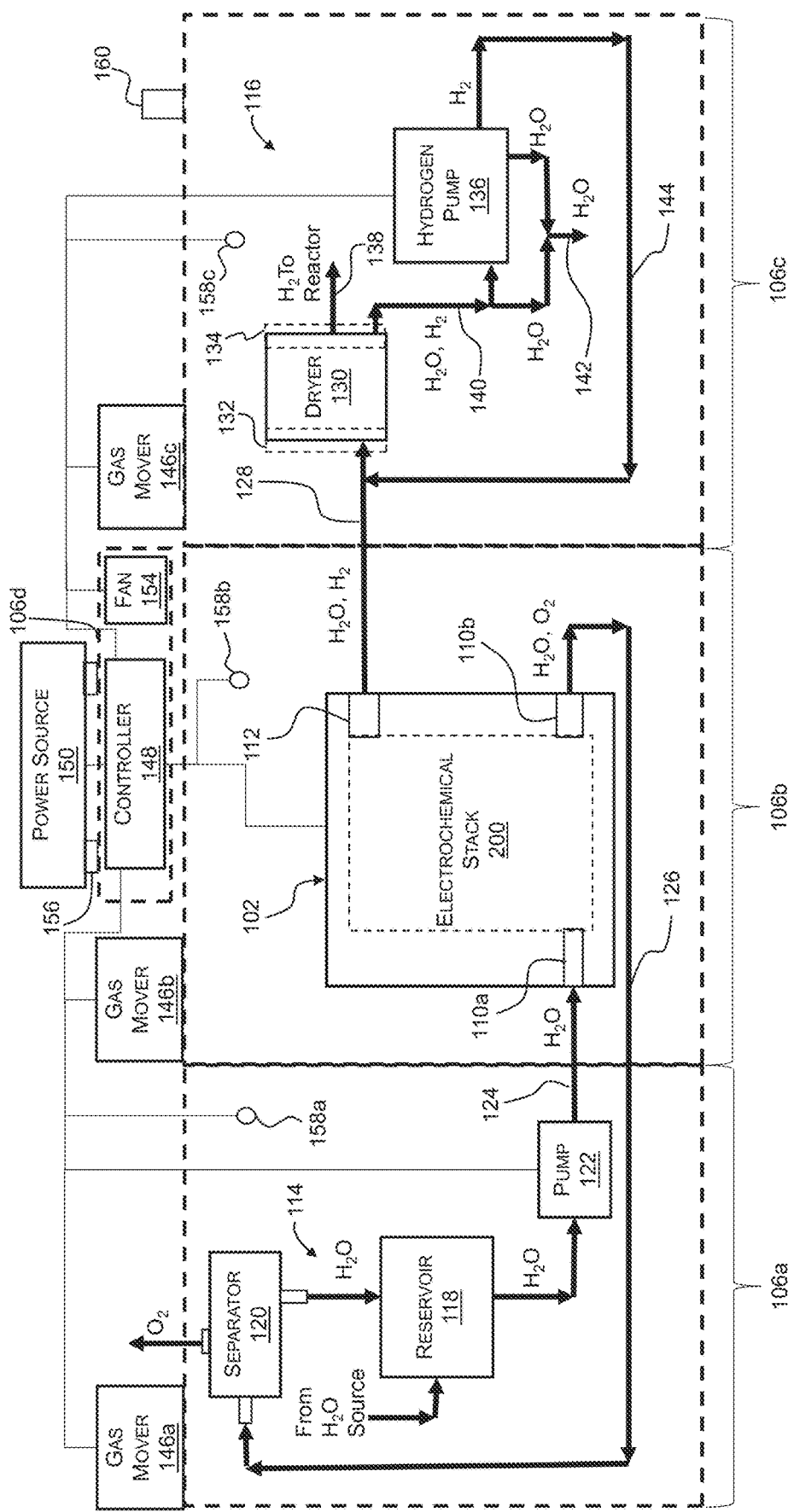
FIG. 1B is a block diagram of the system of FIG. 1A, representing connection of the electrochemical module to a water circuit and a hydrogen circuit in the cabinet.

Referring now to FIGS. 1A and 1B, a system 100 for generating hydrogen may include an electrochemical module 102 and at least one cabinet 104. The at least one cabinet 104 may define a first volume 106a, a second volume 106b, and a third volume 106c that are each isolated from one another, except for fluid connections between the electrochemical module 102 in the second volume 106b and equipment in the first volume 106a and the third volume 106c. While one cabinet (i.e., housing) 104 with three isolated volumes (106a, 106b, 106c) is shown in FIG. 1A, it should be noted that two or three separate cabinets 104 each containing one or two of the three isolated volumes may be used instead. If a single cabinet 104 is used, then the adjacent isolated volumes are isolated from each other by internal walls or partitions 105a, 105b of the cabinet 104. For example, a first internal wall 105a may separate the first volume 106a from the second volume 106b, and a second internal wall 105b may separate the second volume 106b from the third volume 106c. As used herein, two volumes are isolated from each other if a gas in one volume cannot pass into the other volume except through designated fluid conduits (e.g., pipes or manifolds) that connect the two volumes and are configured to provide a gas or a liquid between the two volumes. In one embodiment, each of the volumes 106a, 106b and 106c is separately ventilated by separate dedicated ventilation equipment, as will be described in more detail below.

The electrochemical module 102 may include an electrolyzer module, such as a proton exchange membrane (PEM) based electrolyzer module. The module 102 may include one or more electrochemical stacks 200, such as one or more PEM based electrolyzer stacks. The module 102 may also include a plurality of first fluid connectors 110a,b (referred to collectively as the plurality of first fluid connectors 110a,b and individually as the first fluid connector 110a and the first fluid connector 110b), and a second fluid connector 112. As described in greater detail below, the electrochemical module 102 may be disposed in the second volume 106b (e.g., between the first volume 106a and the third volume 106c) and connected in fluid communication with a water circuit 114 in the first volume 106a via the plurality of first fluid connectors 110a,b and in fluid communication with a hydrogen circuit 116 in the third volume 106c via the second fluid connector 112. Such partitioning of the electrochemical module 102, the water circuit (which includes oxygen processing equipment) 114, and the hydrogen circuit 116 into respective volumes 106b, 106a, 106c which are isolated from one another within the one or more cabinets 104 may facilitate safely generating commercial-scale quantities of hydrogen within a spatially compact footprint. This may be useful for, among other things, using the system 100 to generate hydrogen at installations with limited space and/or transporting the system 100 to remote installation sites. Additionally, or alternatively, as also described in greater detail below, the connectivity between the electrochemical module 102 and each of the water circuit 114 and the hydrogen circuit 116 within the cabinet 104 may include modularity that facilitates installation, maintenance, and repair.

In use, as described in greater detail below, water and electricity may be provided to the electrochemical stack 200, where some of the water may be electrochemically electrolyzed to form hydrogen (e.g., via hydrogen ion diffusion through a PEM electrolyte from an anode side of the electrolyzer cell to the cathode side of the PEM electrolyzer cell). For example, the water circuit 114 may be actuatable to deliver purified water from the first volume 106a of the cabinet 104 to the electrochemical stack 200 in the second volume 106b of the cabinet 104 via the first fluid coupling. As the purified water moves through the electrochemical stack 200, power delivered to the electrochemical stack 200 may move protons of at least some of the purified water through the PEM electrolyte to form hydrogen. Oxygen formed on the anode side of the cell by the electrolysis of the purified water, along with excess purified water, may be returned from the electrochemical stack 200 in the second volume 106b to the water circuit 114 in the first volume 106a. Additionally, or alternatively, the hydrogen formed by electrolysis in the electrochemical stack 200 may move from the cathode side of the electrochemical stack 200 in the second volume 106b of the cabinet 104 to the hydrogen circuit 116 in the third volume 106c of the cabinet 104. Accordingly, to the extent oxygen and hydrogen are present within the second volume 106b, the electrochemical stack 200 manages these streams separately and directs these streams to different portions (i.e., isolated volumes) of the cabinet 104 to reduce the likelihood of inadvertent mixing of oxygen and hydrogen to form a combustible mixture, as compared to a configuration in which oxygen and hydrogen are processed within the same, enclosed volume.

In general, the water circuit 114 may optionally include a reservoir (e.g., water tank) 118 in fluid communication between a separator 120 and a pump 122 via respective fluid conduits. In certain implementations, the reservoir 118 may be coupled to an external water source (e.g., water pipe, not shown) to receive a supply of water suitable for meeting the demands of the electrochemical stack 200. The connection between the reservoir 118 and the external water source may be made outside of the cabinet 104 to facilitate connection of the system 100 to an industrial water supply and, in some instances, to reduce the likelihood of damaging equipment in one or more of the first volume 106a, the second volume 106b, or the third volume 106c in the event of a leak in the connection between the external water source and the reservoir 118. It shall be appreciated that the water circuit 114 may include any of various different types of equipment useful for managing properties of the water flowing through the system 100. As an example, the water circuit 114 may include filtration or other processing equipment useful for purification of process water to reduce the concentration of contaminants that may degrade performance of other components (e.g., the electrochemical stack 200) over time. Additionally, or alternatively, the water circuit 114 may include a heat exchanger (not shown) in thermal communication with one or more of the reservoir 118, the separator 120, or the pump 122 to manage the temperature of each component and/or manage the temperature of water flowing through each component.

The pump 122 may be in fluid communication with the electrochemical stack 200 via a feed conduit 124 extending from the pump 122 in the first volume 106a to the first fluid connector 110a of the electrochemical module 102. The feed conduit 124 may extend through the wall 105a between the first volume 106a and the second volume 106b. In use, the pump 122 may be powered to move purified water from the reservoir 118, along the feed conduit 124 extending from the first volume 106a to the second volume 106b, and into the electrochemical stack 200 in the second volume 106b. Thus, the pump 122 may be operable to deliver purified water to the second volume 106b while being partitioned from equipment in each of the second volume 106b and the third volume 106c. Such partitioning of the pump 122 may be advantageous for, among other things, reducing the likelihood that heat generated by the pump 122 during operation may serve as an ignition source for a hydrogen-containing mixture. For example, in the event of a hydrogen leak in the second volume 106b and/or the third volume 106c, an ignitable hydrogen-air mixture may inadvertently form in the second volume 106b and/or the third volume 106c. Continuing with this example, keeping the pump 122 partitioned away from the second volume 106b and the third volume 106c may, therefore, reduce the likelihood that ignition can occur before the ignitable hydrogen-air mixture can be detected and the system safely shut down.

In some implementations, the water circuit 114 may include a recirculation circuit 126 in fluid communication between the first fluid connector 110b and the separator 120. Through the fluid communication with the first fluid connector 110b, the recirculation circuit 126 may receive an exit flow consisting essentially of water and oxygen from the anode portion of the electrochemical stack 200. At least a portion of the recirculation circuit 126 may extend from the second volume 106b to the first volume 106a through the wall 105b to direct the flow of water and oxygen from the electrochemical stack 200 in the second volume 106b to the separator 120 in the first volume 106a. By carrying oxygen to the separator 120 in the first volume 106a partitioned from the second volume 106b, the recirculation circuit 126 may reduce the likelihood that oxygen in the excess water flowing from the electrochemical module 102 may inadvertently escape into the second volume 106b and/or the third volume 106c to form an ignitable mixture with hydrogen.

The separator 120 may be any one or more of various different types of gas-liquid separators suitable for separating oxygen from excess water in the return flow moving through the recirculation circuit 126 from the electrochemical module 102. For example, the separator 120 may comprise a dryer, a condenser or another device which separates oxygen from excess water through gravity, with the excess water settling along a bottom portion of the separator 120 and oxygen collecting along a top portion of the separator 120. More generally, the separator 120 may operate to separate oxygen from excess water without the use of power or moving parts that could otherwise act as potential ignition sources in the system 100. The oxygen collected by the separator 120 may be directed out of the first volume 106a to be vented to an environment outside of the cabinet 104 or to be used as a process gas for another part of a plant. By way of example and not limitation, the oxygen collected by the separator 120 may be removed from the separator 120 using a suction pump or blower. The excess water collected by the separator 120 may be directed to the reservoir 118 to be circulated through the electrochemical stack 200 again. That is, more generally, the separator 120 may remove oxygen from the cabinet 104 at a position away from hydrogen-related equipment in the second volume 106b and the third volume 106c while facilitating efficient use of water in the formation of hydrogen.

In general, the hydrogen circuit 116 may collect a hydrogen-containing product stream formed by the electrochemical stack 200 in the second volume 106b and process this product stream using equipment partitioned from the first volume 106a and the second volume 106b. In this context, processing the product stream may include removing moisture from the product stream to produce substantially pure hydrogen. That is, removing moisture from hydrogen may reduce the potential for moisture to interfere with one or more downstream processes, with such interference potentially including degradation of downstream equipment. Further, or instead, given considerations associated with safety and energy-to-hydrogen efficiency of the system 100, processing the product stream in the hydrogen circuit 116 may require little or no energy while recovering all or substantially all (e.g., greater than about 99 percent) of the hydrogen produced by the electrochemical stack 200.

In some implementations, the hydrogen circuit 116 may include a product conduit 128 and a dryer 130 in fluid communication with one another. More specifically, the product conduit 128 may extend through the wall 105*b* between the second volume 106*b* and the third volume 106*c*. The product conduit 128 may be in fluid communication between inlet portion 132 of the dryer 130 and the second fluid connector 112 of the electrochemical module 102. Thus, in use, a product stream consisting essentially of hydrogen and water (e.g., water vapor) may move from the anode side of the electrochemical stack 200 to the inlet portion 132 of the dryer 130 via the second fluid connector 112 and the product conduit 128. As compared to the mixture of oxygen and excess water in the exit flow from the anode portion of the electrochemical stack 200 into the recirculation circuit 126, the product stream may be at a higher pressure. To reduce the likelihood of hydrogen leaking into the third volume 106*c*, the connections between the product conduit 128 and each of the second fluid connector 112 and the dryer 130 may include gas tight seals.

The dryer 130 may be, for example, pressure swing adsorption (PSA), a temperature swing adsorption (TSA) system or a hybrid PSA-TSA system. The dryer 130 may include one or more beds of a water-adsorbent material, such as activated carbon, silica, zeolite or alumina. As the product mixture consisting essentially of hydrogen and water moves through from the inlet portion 132 to an outlet portion 134 of the dryer 130, at least a portion of the water may be removed from the product mixture through adsorption of either water or hydrogen in the bed of water-adsorbent material. If hydrogen is adsorbed, then it is removed into the outlet conduit 138 during a pressure and/or temperature swing cycle. If water is adsorbed, then it is removed into a pump conduit 140 during the pressure and/or temperature swing cycle. In some instances, adsorption carried out by the dryer 130 may be passive, without the addition of heat or electricity that could otherwise act as ignition sources of an ignitable hydrogen-containing mixture. In such instances, however, considerations related to backpressure created by the dryer 130 in fluid communication with the electrochemical stack 200 may limit the size and, therefore, the single-pass effectiveness of the dryer 130 in removing moisture from the product stream.

At least in view of such considerations related to single-pass effectiveness of the dryer 130, the hydrogen circuit 116 may further, or instead, include a hydrogen pump 136 in fluid communication between the outlet portion 134 and the inlet portion 132 of the dryer 130 to recirculate the product mixture of hydrogen and water for additional passes through the dryer 130. For example, the dryer 130 may direct dried hydrogen from the outlet portion 134 of the dryer 130 to an outlet conduit 138 that directs the dried hydrogen to a downstream process or storage in an environment outside of the cabinet 104. Further, or instead, the dryer 130 may direct a portion of the product stream that has not adequately dried from the outlet portion 134 of the dryer 130 to a pump conduit 140 in fluid communication with the hydrogen pump 136. In certain instances, at least a portion of the water in the product mixture moving along the pump conduit 140 may condense out of the product mixture and collect in a moisture trap 142 in fluid communication with the pump conduit 140, before reaching the hydrogen pump 136. Such moisture condensed in the moisture trap 142 may be collected and/or directed to an environment outside of the cabinet 104.

The hydrogen pump 136 may be, for example, an electrochemical pump. As used in this context, an electrochemical pump shall be understood to include a proton exchange membrane (i.e., a PEM electrolyte) disposed between an anode and a cathode. The hydrogen pump 136 may generate protons moveable from the anode through the proton exchange membrane to the cathode form pressurized hydrogen. Thus, such an electrochemical pump may be particularly useful for recirculating hydrogen within the hydrogen circuit 116 at least because the electrochemical pumping provided by the electrochemical pump separates hydrogen from water in the mixture delivered to the hydrogen pump 136 via the pump conduit 140 while also pressurizing the separated hydrogen to facilitate moving the pressurized hydrogen to the inlet portion 132 of the dryer 130.

Alternatively, the hydrogen pump 136 may comprise another hydrogen pumping and/or separation device, such as a diaphragm compressor or blower or a metal-hydride separator (e.g., which selectively adsorbs hydrogen), which may be used in combination with or instead of the electrochemical hydrogen pump. In one embodiment, a plurality of stages of hydrogen pumping and/or re-pressurization may be used. Each stage may comprise one or more of the diaphragm compressor or blower, the electrochemical pump or the metal-hydride separator. In one implementation, the stages may be in a cascade (i.e., series) configuration and/or may be located in separate enclosures.

In certain implementations, the hydrogen pump 136 may be in fluid communication with the moisture trap 142, where the water separated from hydrogen in the hydrogen pump 136 may be collected and/or directed to an environment outside of the cabinet 104. Additionally, or alternatively, the pressurized hydrogen formed by the hydrogen pump 136 may be directed along a recovery circuit 144 in fluid communication between the hydrogen pump 136 and the inlet portion 132 of the dryer 130 (e.g., via mixing with the product stream in the product conduit 128) to recirculate the pressurized hydrogen to the dryer 130. Among other advantages, recirculating the pressurized hydrogen through the dryer 130 in this way facilitates moving hydrogen out of the cabinet 104 through only a single conduit (e.g., the outlet conduit 138), which may reduce potential failure modes as compared to the use of multiple exit points.

In some implementations, the separate ventilation and/or forced convection within each of the first volume 106*a*, the second volume 106*b*, and the third volume 106*c* may be useful for reducing the likelihood of forming an ignitable hydrogen-containing mixture in the respective volume. Further, or instead, forced convection may facilitate controlling temperature in the enclosed environments of the first volume 106*a*, the second volume 106*b*, and the third volume 106*c*. Such temperature control may be useful, for example, for reducing the likelihood that equipment in each respective volume may become an ignition source and/or may fail prematurely.

Accordingly, the system 100 may include a plurality of gas movers 146*a,b,c* (referred to collectively as the plurality of gas movers 146*a,b,c* and individually as the gas mover 146*a*, the gas mover 146*b*, and the gas mover 146*c*). The plurality of gas movers 146*a,b,c* may include any one or more of various different types of fans (e.g., purge fans), blowers, or compressors, unless otherwise specified or made clear from the context. In certain implementations, a powered circuit to each one of the plurality of gas movers 146*a,b,c* may be rated for Class 1 Division 2 operation, as specified according to the National Fire Protection Association (NFPA) 70®, National Electric Code® (NEC), Articles 500-503, 2020, the entire contents of which are incorporated herein by reference. In such implementations, each one of the plurality of gas movers 146a,b,c may be disposed within the cabinet 104. Alternatively, each one of the plurality of gas movers 146a,b,c may be mounted externally to the cabinet 104 (e.g., to the roof or sidewall of the cabinet) to reduce the potential for heat or sparks to act as an inadvertent ignition source for contents of the first volume 106a, the second volume 106b, or the third volume 106c.

In general, the gas mover 146a may be in fluid communication with the first volume 106a, the gas mover 146b may be in fluid communication with the second volume 106b, and the gas mover 146c may be in fluid communication with the third volume 106c. For example, each one of the plurality of gas movers 146a,b,c may be in fluid communication between an environment outside of the cabinet 104 and a corresponding one of the first volume 106a, the second volume 106b, and the third volume 106c, and may be configured to separately ventilate the respective volume of the cabinet 104. Additionally, or alternatively, each one of the plurality of gas movers 146a,b,c may be operable to form negative pressure in a corresponding one of the first volume 106a, the second volume 106b, and the third volume 106c, relative to the environment outside of the cabinet 104. Such negative pressure may be useful, for example, for drawing air from the environment into the first volume 106a, the second volume 106b, and the third volume 106c to reduce the likelihood that any hydrogen leaking into the first volume 106a, the second volume 106b, or the third volume 106c may accumulate in a concentration above the lower ignition limit of a hydrogen-air mixture at the temperature and pressure associated with the cabinet 104. Further, or instead, negative pressure in the first volume 106a, the second volume 106b, and the third volume 106c may reduce the likelihood that an ignitable, hydrogen containing mixture may escape from the cabinet 104. In certain instances, the cabinet 104 may be insulated to facilitate maintaining one or more components in the first volume 106a, the second volume 106b, and the third volume 106c within a temperature range (e.g., between about 60° C. and about 80° C.) suitable for operation of the electrochemical stack 200.

While the plurality of gas movers 146a,b,c may be useful for reducing the likelihood of unsafe conditions forming in the first volume 106a, the second volume 106b, or the third volume 106c, it shall be appreciated that one or more of these volumes may additionally, or alternatively, include area classified components. In such instances, the corresponding volume may be unventilated.

In certain implementations, the system 100 may include a controller 148 in electrical communication at least with one or more components in the first volume 106a, the second volume 106b, or the third volume 106c. In general, the controller 148 may include one or more processors and a non-transitory computer-readable storage medium having stored thereon instructions for causing the one or more processors to control one or more of startup, operation, or shutdown of any one or more of various aspects of the system 100 to facilitate safe and efficient operation. For example, the controller 148 may include one or more embedded controllers for one or more components in the first volume 106a, the second volume 106b, or the third volume 106c. Additionally, or alternatively, the controller 148 may be in electrical communication at least with the electrochemical stack 200 and a power source 150. Continuing with this example, the controller 148 may interrupt power to the electrochemical stack 200 in the event that an anomalous condition is detected. Further, or instead, the controller 148 may provide power to the electrochemical stack 200 after a startup protocol (e.g., purging the first volume 106a, the second volume 106b, and or the third volume 106c) to reduce the likelihood of igniting a hydrogen-containing mixture in the cabinet 104.

In some implementations, the cabinet 104 may define a fourth volume 106d, and the controller 148 may be disposed in the fourth volume 106d while being in wireless or wired communication with one or more of the various different components described herein as being disposed in one or more of the first volume 106a, the second volume 106b, or the third volume 106c. The fourth volume 106d may be generally located in the vicinity of the first volume 106a, the second volume 106b, and the third volume 106c to facilitate making and/or breaking electrical connections as part of one or more of installation, startup, regular operation, maintenance, or repair. Thus, for example, the fourth volume 106d may be disposed along a top portion of the cabinet 104 and/or along a back portion of the cabinet 104, with both locations providing useful access to each of the first volume 106a, the second volume 106b, and the third volume 106c while being away from the first door 152a, the second door 152b, and the third door 152c that may be used to provide access to the first volume 106a, the second volume 106b, and the third volume 106c, respectively. Further, or instead, with the controller 148 disposed therein, the fourth volume 106d may be fluidically isolated from each of the first volume 106a, the second volume 106b, and/or the third volume 106c by a roof 105c or back wall of the cabinet 104 to reduce the likelihood of exposing the controller 148 to one or more process fluids during installation, startup, regular operation, shutdown, maintenance, or repair that may compromise operation of the controller 148.

While the first volume 106a, the second volume 106b, and the third volume 106c have been described as having a negative pressure provided by the plurality of gas movers 146a, 146b, and 146c, the fourth volume 106d may be in fluid communication with a fan 154 operable to generate positive pressure in the fourth volume 106d, relative to an environment outside of the fourth volume 106d, to control temperature of the controller 148 and/or other components within the fourth volume 106d. Further, or instead, while the fourth volume 106d has been described as housing the controller 148, it shall be appreciated that the fourth volume 106d may house all controls and power electronics for the system 100, as may be useful for reducing the likelihood that inadvertent sparking or overheating of one or more of such components can ignite a hydrogen-containing mixture in one or more of the first volume 106a, the second volume 106b, or the third volume 106c.

In certain implementations, the controller 148 may further, or instead, monitor one or more ambient conditions in the first volume 106a, the second volume 106b, and the third volume 106c to facilitate taking one or more remedial actions before an anomalous condition results in damage to the system 100 and/or to an area near the system 100. In particular, given the potential damage that may be caused by the presence of an ignitable hydrogen-containing mixture within the cabinet 104, the system 100 may include a plurality of gas sensors 158a,b,c (referred to collectively as the plurality of gas sensors 158a,b,c and individually as the gas sensor 158a, the gas sensor 158b, and the gas sensor 158c). Each one of the plurality of gas sensors 158a,b,c may include any one or more of various different types of hydrogen sensors, such as one or more of optical fiber sensors, electrochemical hydrogen sensors, thin film sensors, and the like. To facilitate robust detection of hydrogen within the cabinet 104, the gas sensor 158a may be disposed in the first volume 106a, the gas sensor 158b may be disposed in the second volume 106b, and the gas sensor 158c may be disposed in the third volume 106c. Each one of the plurality of gas sensors 158a,b,c may be calibrated to detect hydrogen concentration levels below the ignition limit of hydrogen to facilitate taking remedial action before an ignition event can occur. Toward this end, the controller 148 may be in electrical communication with each one of the plurality of gas sensors 158a,b,c, and the non-transitory computer readable storage media of the controller 148 may have stored thereon instructions for causing one or more processors of the controller 148 to interrupt electrical communication between the power source 150 and equipment in the cabinet 104 based on a signal, received from one or more of the plurality of gas sensors 158a,b,c, and indicative of a dangerous hydrogen concentration. Additionally, or alternatively, the signal received from the one or more of the plurality of gas sensors 158a,b,c may be indicative of a rapid increase in hydrogen concentration.

While the controller 148 may be useful for taking remedial action with respect to potentially hazardous conditions in the cabinet 104, the system 100 may additionally, or alternatively, include one or more safety features useful for mitigating damage to the system 100 and/or in the vicinity of the system in the event of an explosion. For example, the system 100 may include a pressure relief valve 160 in fluid communication with at least the third volume 106c of the cabinet 104. The pressure relief valve 160 may be a mechanical valve that is self-opening at a predetermined threshold pressure in the third volume 106c. In some instances, the predetermined threshold pressure may be a pressure increase resulting from leakage of pressurized hydrogen into the third volume 106c. Alternatively, the predetermined threshold pressure may be a high pressure associated with a rapid pressure rise associated with combustion of a hydrogen-containing mixtures. In each case, the pressure relief valve 160 may vent contents of the third volume 106c to the environment to mitigate damage that may otherwise occur.

In general, the components within the cabinet 104 may be connectable to external resources from a location outside of the cabinet 104, such as along one or more surfaces of the cabinet 104. Without the need for personnel to open the cabinet 104, such connections may facilitate installation of the system 100. Further, or instead, for an otherwise comparable arrangement of components, connections made on the outside of the cabinet 104 may provide additional spacing between components in each of the first volume 106a, the second volume 106b, and the third volume 106c. This, in turn, may be useful for providing trained personnel with better access to components within the cabinet 104. Further, or instead, connecting components along one or more outer surfaces of the cabinet 104 may provide advantages with respect to safety. For example, electrical contacts 156 may be disposed on an outer surface of the cabinet 104 (e.g., along an outer surface of the cabinet 104 defining the fourth volume 106d), and the electrical contacts 156 may be in electrical communication with at least the electrochemical stack 200 via the controller 148. Continuing with this example, the electrical contacts 156 may be releasably engageable (e.g., via a contactor or fuse) in electrical communication with the power source 150 located on the outside of the cabinet 104. In the event that a disconnect function causes a spark, the spark is located outside of the cabinet 104 and generally away from potentially ignitable hydrogen-containing gas mixtures that may inadvertently form in the first volume 106a, the second volume 106b, and/or the third volume 106c.

Having described certain aspects of the overall layout of the system 100 useful for safely producing hydrogen within a small footprint, attention is now directed to specific features of the electrochemical module 102 itself that may facilitate separately managing water and gas in the electrochemical module 102 to provide additional, or alternative, safety during operation of the system 100 and/or to facilitate installation, maintenance, and/or repair of the system 100, thus reducing downtime associated with such events.

Figure 2A:
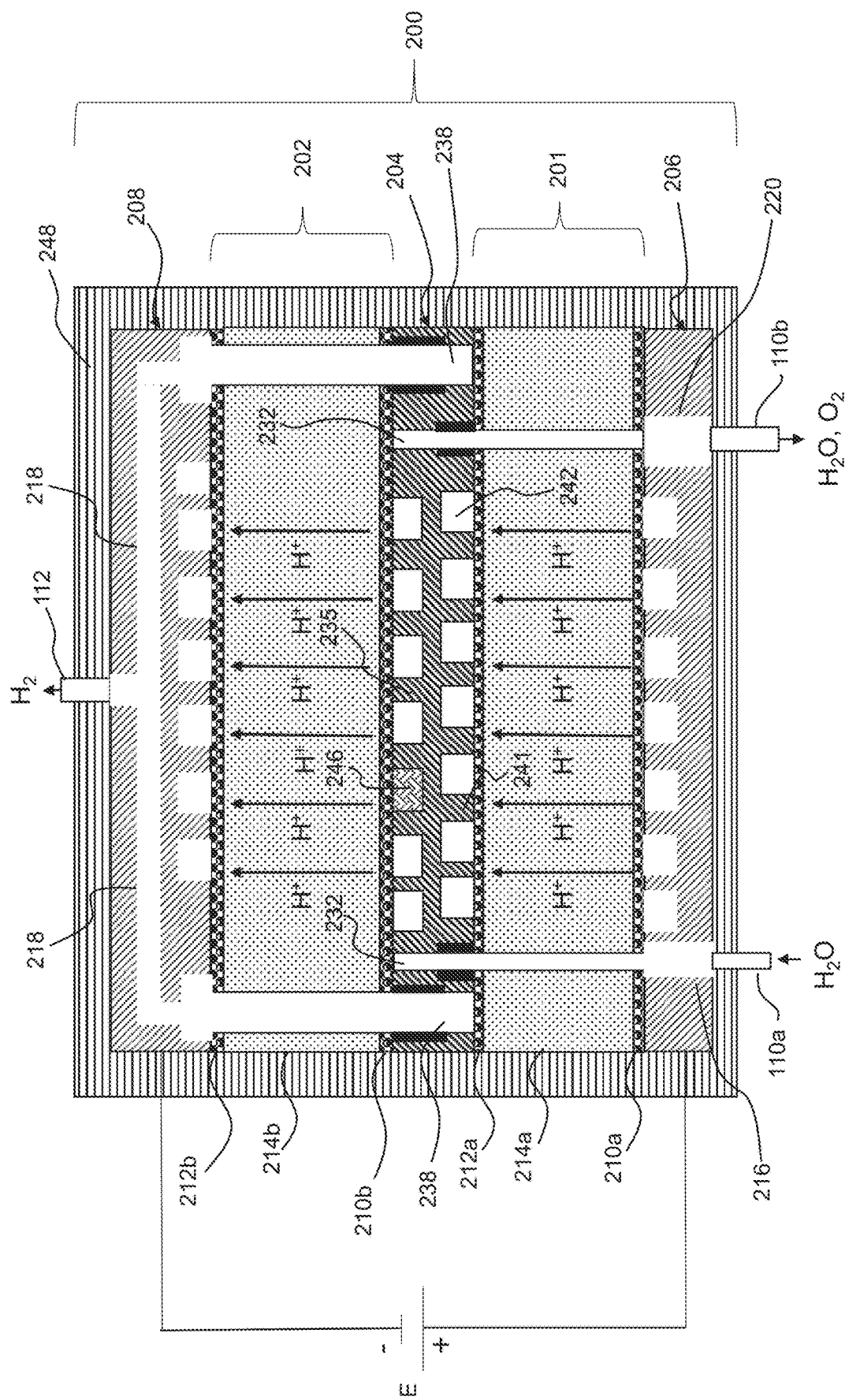
FIG. 2A is a schematic representation of an electrochemical stack of the electrochemical module of the system of FIGS. 1A and 1B.
Figure 2B:
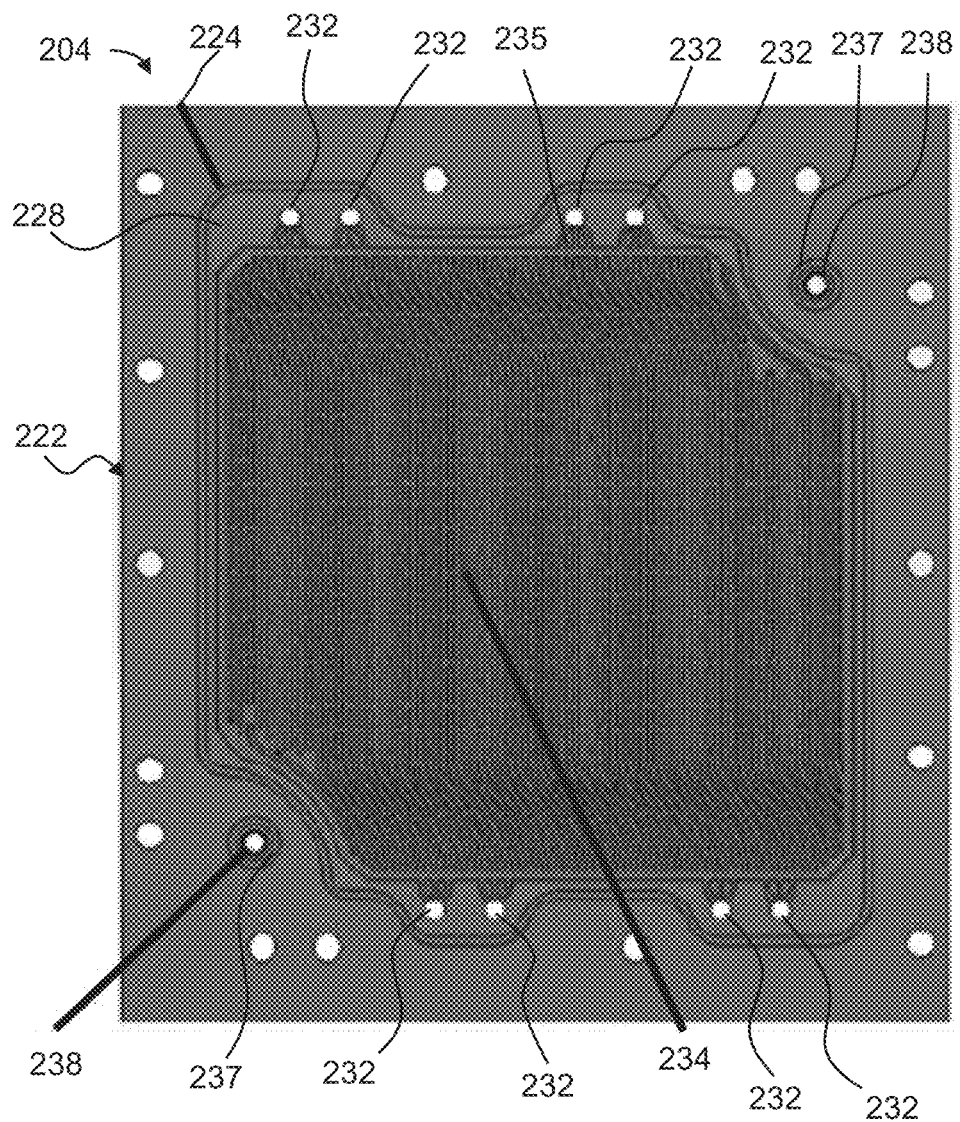
FIG. 2B is a top view of an anode side of a bipolar plate of the electrochemical stack of FIG. 2A.
Figure 2C:
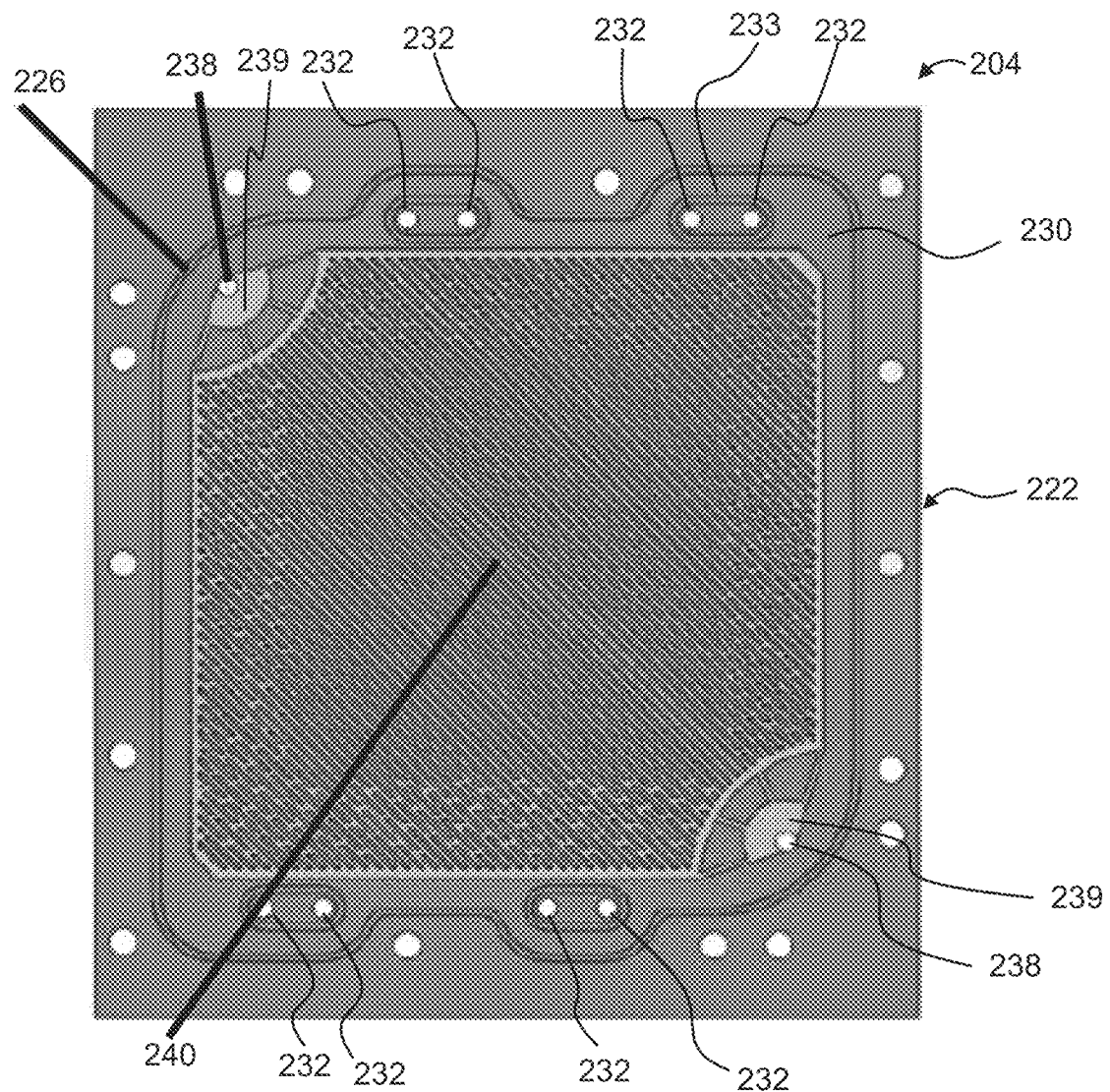
FIG. 2C is a top view of a cathode side of the bipolar plate of FIG. 2B.

Referring now to FIG. 2A-2C, the electrochemical stack 200 may include a first membrane electrode assembly (MEA) 201, a second membrane electrode assembly (MEA) 202, and a bipolar plate 204 that collectively define two complete electrochemical cells for the generation of hydrogen. The electrochemical stack 200 may also include a first end plate 206 and a second end plate 208 that may sandwich the first MEA 201, the second MEA 202, and the bipolar plate 204 into contact with one another and direct the flow of fluids into and out of the electrochemical stack 200. While the electrochemical stack 200 is described as including two complete cells—a single bipolar plate and two MEAs—it shall be appreciated that this is for the sake of clarity of explanation and illustration only. It shall be more generally understood that the electrochemical stack 200 may include any number of MEAs and bipolar plates useful for meeting the hydrogen generation demands of the system 100 shown in FIGS. 1A and 1B, while maintaining separation between pressurized hydrogen and lower pressure water and oxygen flowing through the electrochemical stack 200. That is, unless otherwise specified or made clear from the context, the electrochemical stack 200 may include more than one bipolar plate, a single MEA, and/or more than two MEAs. Further, or instead, while the electrochemical stack 200 is shown as including the first end plate 206 in contact with the first MEA 201 and the second end plate 208 in contact with the second MEA 202, it shall be appreciated that this is again for the sake of clear and efficient description. That is, in some instances, an instance of the bipolar plate 204 may be disposed between the first end plate 206 and the first MEA 201 and/or between the second end plate 208 and the second MEA 202, without departing from the scope of the present disclosure.

In general, the first MEA 201 and the second MEA 202 may be identical to one another. For example, the first MEA 201 may include an anode 210a, a cathode 212a, and a proton exchange membrane (e.g., a PEM electrolyte) 214a therebetween. Similarly, the second MEA 202 may include an anode 210b, a cathode 212b, and a proton exchange membrane 214b therebetween. The anodes 210a, 210b may each comprise an anode catalyst (i.e., electrode) contacting the membrane and an optional anode fluid diffusion layer. The cathodes 212a, 212b may each comprise a cathode catalyst (i.e., electrode) contacting the membrane and an optional cathode gas diffusion layer. The anode electrode may comprise any suitable anode catalyst, such as an iridium layer. The anode fluid diffusion layer 246 may comprise a porous material, mesh or weave, such as a porous titanium sheet or a porous carbon sheet. The cathode electrode may comprise any suitable cathode catalyst, such as a platinum layer. The cathode gas diffusion layer may comprise porous carbon. Other noble metal catalyst layers may also be used for the anode and/or cathode electrodes. The electrolyte may comprise any suitable proton exchange (e.g., hydrogen ion transport) polymer membrane, such as a Nafion® membrane composed of sulfonated tetrafluoroethylene based fluoropolymer-copolymer having a formula $C_7HF_{13}O_5S \cdot C_2F_4$.

The bipolar plate 204 may be disposed between the cathode 212a of the first MEA 201 and the anode 210b of the second MEA 202. In general, the bipolar plate 204 may include a substrate 222, an anode gasket 224, and a cathode gasket 226. The substrate 222 has an anode (i.e., water) side 228 and a cathode (i.e., hydrogen) side 230 opposite one another. The anode gasket 224 may be fixed to the anode side 228 of the substrate 222, and the cathode gasket 226 may be fixed to the cathode side 230 of the substrate 222. Such fixed positioning of the anode gasket 224 and the cathode gasket 226 on opposite sides of the substrate 222 may facilitate forming two seals that are consistently placed relative to one another and relative to the first MEA 201 and the second MEA 202 on either side of the bipolar plate 204. The gaskets form a double seal around the active areas (i.e., anode (e.g., water) flow field 234 and cathode (e.g., hydrogen) flow field 240) located on respective opposite sides 228, 230 of the bipolar plate 204. Further, or instead, in instances in which an electrochemical stack includes an instance of an MEA between two instances of the bipolar plate 204, the anode gasket 224 and the cathode gasket 226 may form a double seal along an active area of the MEA. Thus, more generally, it shall be appreciated that the anode gasket 224 and the cathode gasket 226 may form a sealing engagement with one or more MEAs in an electrochemical stack to isolate flows within the electrode stack and, thus, reduce the likelihood that pressurized hydrogen may inadvertently mix with a flow of water and oxygen exiting the electrochemical stack to create an combustible hydrogen-oxygen mixture in the system 100 shown in FIGS. 1A and 1B.

The substrate 222 may be formed of any one or more of various different types of materials that are electrically conductive, thermally conductive, and have strength suitable for withstanding the high pressure of hydrogen flowing along the cathode side 230 of the substrate 222 during use. Thus, for example, the substrate 222 may be at least partially formed of one or more of plasticized graphite or carbon composite. Further, or instead, the substrate 222 may be advantageously formed of one or more materials suitable for withstanding prolonged exposure to water on the anode side 228 of the substrate 222. Accordingly, in some instances, the anode side 228 of the substrate 222 may include an oxidation inhibitor coating that is electrically conductive, examples of which include titanium, titanium oxide, titanium nitride, or a combination thereof. The oxidation inhibitor may generally extend at least along those portions of the anode side 228 of the substrate 222 exposed to water during operation of the electrochemical stack 200. That is, the oxidation inhibitor may extend at least along the anode flow field 234 inside the anode gasket 224 on the anode side 228 of the substrate 222. In some implementations, the oxide inhibitor may extend along the plurality of anode ports (i.e., water riser openings) 232 which extend from the anode side 228 to the cathode side 230 of the substrate 222. The oxidation inhibitor may also be located in the anode plenums 235 which connect the anode portions 232 to the anode flow field 234 on the anode side of the substrate 222.

A cathode ring seal 237 may be located around each cathode port (i.e., hydrogen riser opening) 238 on the anode side 228 of the substrate, as shown in FIG. 2B. The cathode ring seal 237 prevent hydrogen from leaking out into the anode flow field 234 on the anode side 228 of the substrate 222. In contrast, an anode ring seal 233 may be located around each one or more anode ports 232 on the cathode side 230 of the substrate 222. For example, as shown in FIG. 2C, two anode ports 232 are surrounded by a common anode ring seal 233 to prevent water from flowing into the cathode flow field 240 on the cathode side of the substrate 222.

The anode flow field 234 includes a plurality of straight and/or curved ribs 235 separated by flow channels 236 oriented to direct a liquid (e.g., purified water) between at least some of the plurality of anode ports 232, such as may be useful for evenly distributing purified water along the anode 210b of the second MEA 202 in the configuration shown in FIG. 2A. The anode gasket 224 may circumscribe the anode flow field 234 and the plurality of anode ports 232 along the anode side 228 of the substrate 222 to limit the movement of purified water moving along the anode 210b. That is, the anode side 228 of the substrate 222 may be in sealed engagement with the anode 210b of the second MEA 202, via the anode gasket 224, such that anode channels 236 are located therebetween. Under pressure provided by a source external to the electrochemical stack 200 (e.g., such as the pump 122 of the water circuit 114 shown in FIG. 1B), a liquid provided from the first fluid connector 110a flows along the anode channels 236 is directed across the anode 210b of the second MEA 202, from one instance of the plurality of anode ports 232 to another instance of the plurality of anode ports 232, where the liquid (e.g., remaining water and oxygen) may be directed out of the electrochemical stack 200 through another first fluid connector 110b Additionally the substrate 222 may include plurality of cathode ports (i.e., hydrogen riser openings) 238, each extending from the anode side 228 to the cathode side 230 of the substrate 222. The cathode side 230 of the substrate 222 may include cathode flow field 240. The cathode flow field 240 includes a plurality of straight and/or curved ribs 241 separated by cathode flow channels 242 oriented to direct gas (e.g., hydrogen) toward the plurality of cathode ports 238, such as may be useful for directing pressurized hydrogen formed along the cathode 212a of the first MEA 201 in the configuration shown in FIG. 2A. Cathode plenums 239 may be located between the respective cathode ports 238 and the cathode flow field 240. The cathode gasket 226 may circumscribe the cathode flow field 240, the cathode plenums 239 and the plurality of cathode ports 238 along the cathode side 230 of the substrate 222 to limit movement of the pressurized hydrogen along the cathode 212a. For example, the cathode side 230 of the substrate 222 may be in sealed engagement with the cathode 212a of the first MEA 201, via the cathode gasket 226, such that the cathode flow channels 242 are defined between the cathode 212a of the first MEA 201 and the cathode side 230 of the substrate 222. The pressure of the hydrogen formed along the cathode 212a may move the hydrogen along at least a portion of the cathode channels 242 and toward the cathode ports 238 located diagonally opposite to the cathode inlet port. The pressurized hydrogen may flow out of the cathode ports 238 and out of the electrochemical stack 200 through the second fluid connector 112 to be processed by the hydrogen circuit 116 as shown in FIG. 1B.

The anode gasket 224 on the anode side 228 of the substrate 222 and the cathode gasket 226 on the cathode side 230 of the substrate 222 may have different shapes (as shown in FIGS. 2B and 2C). For example, the anode gasket 224 may extend between the plurality of anode ports 232 and the plurality of cathode ports 238 on the anode side 228 of the substrate 222. In other words the anode gasket 224 surrounds the anode ports 232 and the anode flow field 234 on one lateral side, but leaves the cathode portions 238 outside its circumscribed area. In an installed position, therefore, the anode gasket 224 may fluidically isolate anode flow from cathode flow.

In contrast, the cathode gasket 226 on the cathode side 230 of the substrate 222 does not extend between the plurality of anode ports 232 and the plurality of cathode ports 238. In other words the cathode gasket 226 surrounds the anode ports 232, the cathode portions 238 and the cathode flow field 240. Instead, the anode ring seals 233 isolate the anode portions 232 from the cathode ports 238 and the cathode flow field 240 on the cathode side 230 of the substrate 222.

In one configuration the anode flow field 234 and the cathode flow field 240 may have the same shape, albeit on opposite side of the substrate 222 to provide the same active area along the first MEA 201 and the second MEA 202. Thus, taken together, it shall be appreciated that the differences in shape between the anode gasket 224 and the cathode gasket 226 along with positioning of the anode ring seals and the same shape of the anode flow field 234 and the cathode flow field 240 may result in different sealed areas. These different sealed areas are complementary to one another to facilitate fluidically isolating the lower pressure flow of purified water along the anode channels 236 from the pressurized hydrogen flowing along the cathode channels 242 while nevertheless allowing each flow to move through the electrochemical stack 200 and ultimately exit the electrochemical stack 200 along different channels.

In certain implementations, the cathode flow field 240 may be shaped such that a minimum bounding rectangle of the cathode flow field 240 is square. As used in this context, the term minimum bounding rectangle shall be understood to be a minimum rectangle defined by the maximum x- and y-dimensions of the cathode flow field 240. The plurality of cathode ports 238 may include two cathode ports per substrate 222 which are located in diagonally opposite corners from one another with respect to the minimum bounding rectangle (e.g., within the minimum bounding rectangle). The other two diagonally opposite corners lack the cathode ports 238. In instances in which the minimum bounding rectangle is square, the diagonal positioning of the cathode ports 238 relative to the minimum bounding rectangle may facilitate flow of pressurized hydrogen diagonally along the entire cathode flow field 240, while leaving a large margin of the substrate 222 material for strengths against the contained internal hydrogen pressure. Alternatively, the substrate 222 may be a rectangle. The plurality of cathode ports 238 are positioned away from edges of the substrate 222 such that each one of the plurality of cathode ports 238 is well-reinforced by the material of the substrate 222 between the respective one of the plurality of cathode ports 238 and the closest edge of the substrate 222.

Given the large pressure differential between the flow of pressurized hydrogen along the cathode channels 242 and the flow of water and oxygen along the anode channels 236, the electrochemical stack 200 may include the anode fluid diffusion layer disposed in the anode channels 236 and optionally between the anode electrode of the anode 210b of the second MEA 202 and the anode side 228 (e.g., anode ribs 235) of the substrate 222. The porous material of the anode fluid diffusion layer 246 may generally permit the flow of water and oxygen through the anode channels 236 without a substantial increase in flow restriction through the anode channels 236 while providing structural support on the anode side 228 of the substrate 222 to resist collapse that may result from the pressure difference on opposite sides of the substrate 222. For the sake of clear illustration, the porous material 246 is shown along only one anode channel 236. It shall be understood, however, the that porous material 246 may be disposed inside all of the anode channels 236 in certain implementations.

As an additional, or alternative, safety measure, the electrochemical stack 200 may include a housing 248 disposed about the first MEA 201, the second MEA 202, the bipolar plate 204, the first end plate 206, and the second end plate 208, as shown in FIG. 2A. More specifically, the housing 248 may be formed of one or more materials useful for absorbing force of one or more materials that may become ejected in the event of a failure event (e.g., failure under the force of pressurized hydrogen and/or failure resulting from explosion of an inadvertent hydrogen-containing mixture). As an example, the housing 248 may include one or more of metal or aramid (e.g., Kevlar®) fibers.

Having described various features of the electrochemical stack 200, attention is now directed to a description of operation of the electrochemical stack 200 to form pressurized hydrogen with water and electricity as inputs. In particular, as shown in FIG. 2A, an electric field E (i.e., voltage) may be applied across the electrochemical stack 200 (i.e., between the end plates 206 and 208) from the power source 150 shown in FIG. 1B. The bipolar plate 204 may electrically connect the first MEA 201 and the second MEA 202 in series with one another such that electrolysis may take place at the first MEA 201 and the second MEA 202 to form a flow of pressurized hydrogen that is maintained fluidically isolated from lower pressure water and oxygen, except for proton exchange occurring through the proton exchange membrane 214a and the proton exchange membrane 214b.

Purified water (e.g., from the water circuit 114 shown in FIG. 1B) may be introduced into the electrochemical stack 200 via the first fluid connector 110a of the electrochemical module 102 as shown in FIG. 1B. Within the electrochemical stack 200, the purified water may flow along an intake channel 216 that extends through the bipolar plate 204, among other components, to direct the purified water to the anode 210a of the first MEA 201 and to the anode 210b of the second MEA 202. With the electric field E applied across the anode 210a and the cathode 212a of the first MEA 201, the purified water may break down along the anode 210a into protons ($H^+$) and oxygen. The protons ($H^+$) may move from the anode 210a to the cathode 212a through the proton exchange membrane 214a. At the cathode 212a, the protons ($H^+$) may combine with one another to form pressurized hydrogen along the cathode 212a. Through an analogous process, pressurized hydrogen may also be formed along the cathode 212b of the second MEA 202. The flows of pressurized hydrogen formed by each of the first MEA 201 and the second MEA 202 may combine with one another and flow out of the electrochemical stack 200 via two hydrogen exhaust channels 218 that extends through the bipolar plate 204, among other components, to ultimately direct the pressurized hydrogen out of the second fluid connector 112 of the electrochemical module 102 and toward the hydrogen circuit 116 for processing (as shown in FIG. 1B and discussed above). The flows of oxygen and water along the anode 210a and the anode 210b may combine with one another and flow out of the electrochemical stack 200 via the outlet anode ports 232 and an outlet channel 220 that extends through the end plate 206, among other components, to direct this stream of water and oxygen out of the first fluid connector 110b of the electrochemical module 102 and toward the water circuit 114 for processing (as shown in FIG. 1B and discussed above).

As discussed above, the bipolar plate 204 may be in sealed engagement with the cathode 212a of the first MEA 201 and the anode 210b of the second MEA to facilitate keeping pressurized hydrogen formed along the cathode 212a of the first MEA 201 separate from water and oxygen flowing along the anode 210b of the second MEA 202. This separation is useful for reducing the likelihood of leakage of pressurized hydrogen from the electrochemical stack 200 and, thus, may be useful in addition to, or instead of, any one or more aspects of the modularity of the system 100 (shown in FIGS. 1A and 1B) with respect to safely producing industrial-scale quantities of hydrogen through electrolysis. Additionally, or alternatively, as described in greater detail below with respect to FIGS. 3A and 3B, the sealed engagement facilitated by the bipolar plate 204 may facilitate dismantling the electrochemical module 102 (e.g., to repair, maintain, and/or replace the electrochemical stack 200) with a lower likelihood of spilling water in the vicinity of the cabinet 104 shown in FIG. 1A.

Figure 3A:
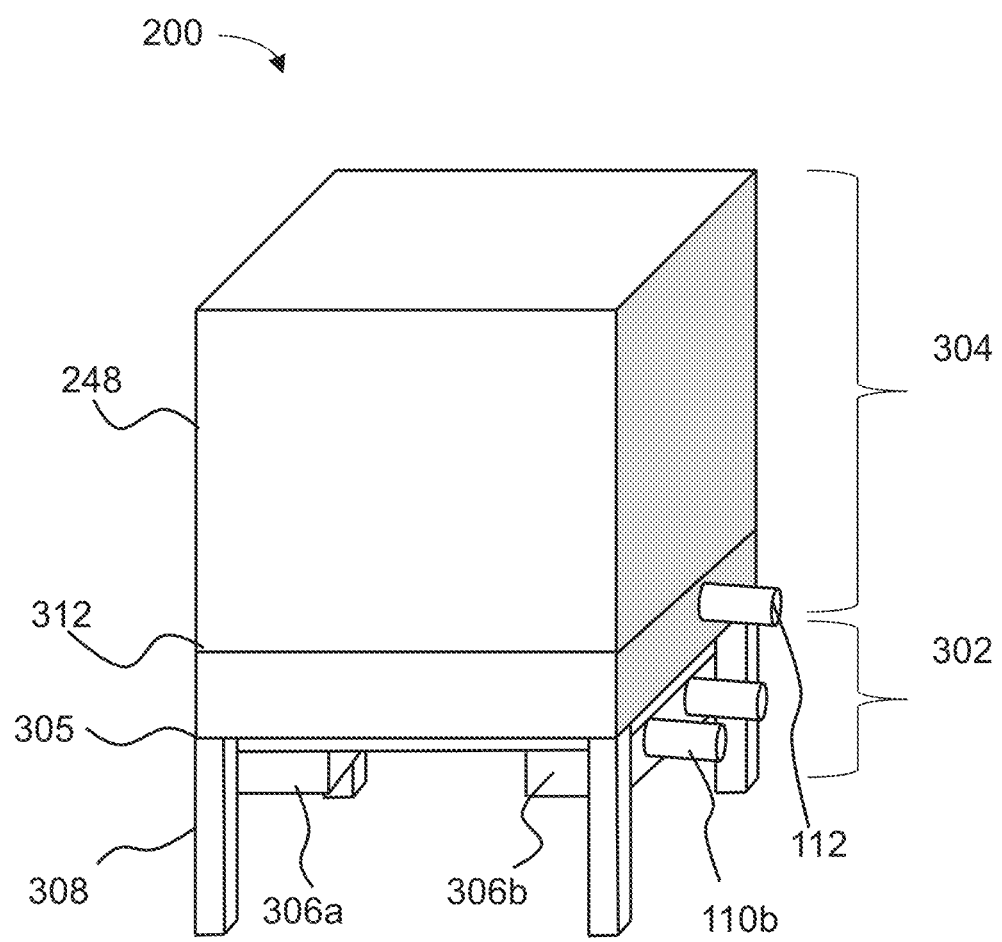
FIG. 3A is a perspective view of the electrochemical module of the system of FIGS. 1A and 1B, shown with a liquid-management section and a gas-management section of the electrochemical module shown coupled to one another.
Figure 3B:
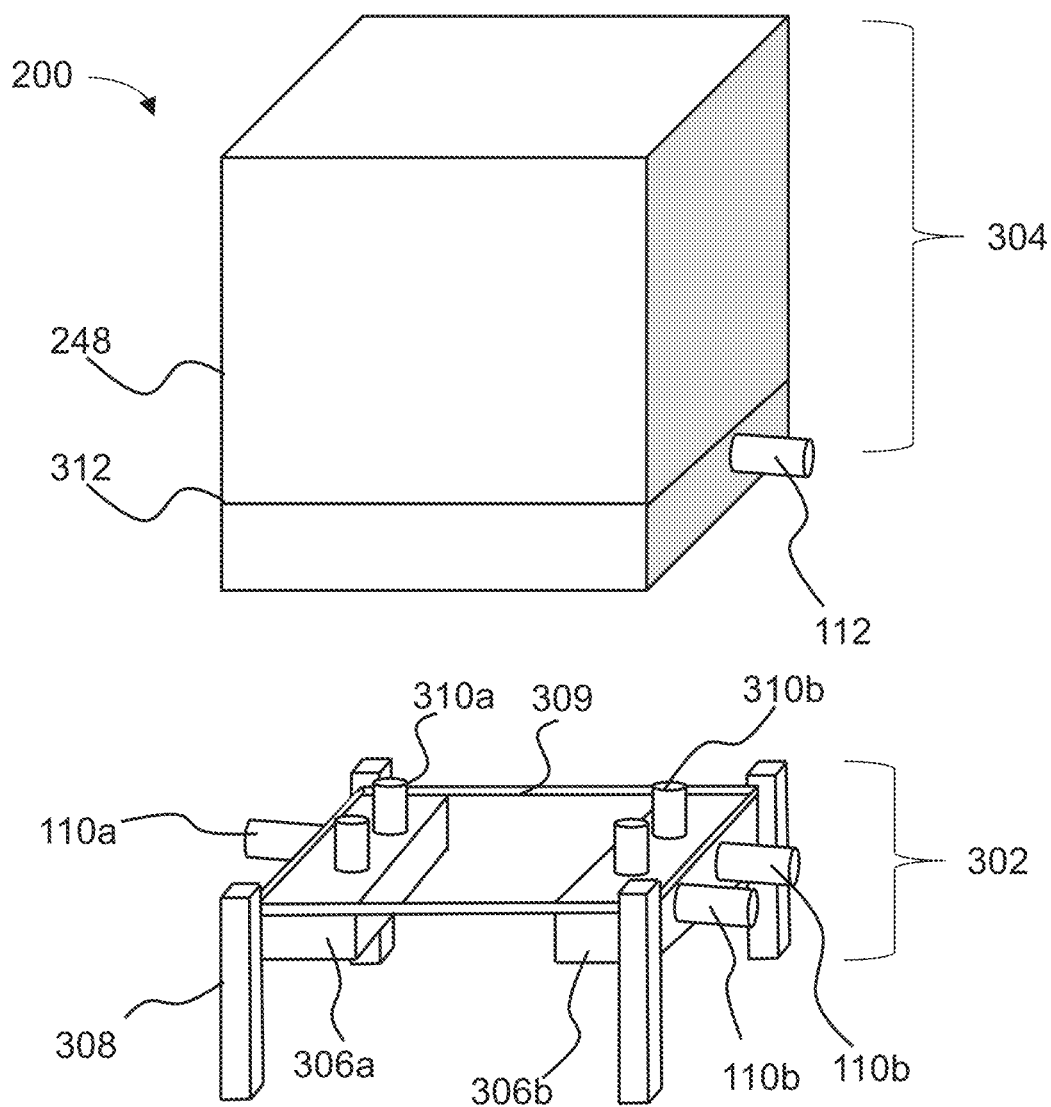
FIG. 3B is a partial exploded view of the electrochemical module of the system of FIGS. 1A and 1B, shown with the liquid-management section and the gas-management section of the electrochemical module decoupled from one another.

Referring now to FIGS. 3A and 3B, the electrochemical module 102 may include a liquid-management section 302 and a gas-management section 304 that are releasably securable to one another (e.g., using clamps, bolts, or a combination thereof) along an interface 305 to facilitate installation, maintenance, and/or repair. For example, the gas-management section 304 may be removable from the liquid-management section 302 without the need to break water connections at the first fluid connectors 110a,b. As compared to installations requiring removal of water connections, the ability to remove the gas-management section 304 from the liquid-management section 302 may reduce the time required performing a mechanical operation related to installation, maintenance, and/or repair. Further, or instead, because water connections may remain intact, inadvertent dispersion of water around the cabinet 104 shown in FIG. 1A is less likely.

In general, the liquid-management section 302 may include the plurality of first fluid connectors 110a,b fluidly connected to respective inlet and outlet water manifolds 306a,b. Each one of the plurality of first fluid connectors 110a,b may be in fluid communication with the respective manifold 306a,b. In turn, the manifolds 306a,b may include respective liquid connections 310a, 310b (e.g., O-rings and/or tubes) securable to the gas-management section 304, to deliver purified water to the gas-management section 304 via the first fluid connector 110a and the liquid connection 310a and to receive an anode-out flow of water and oxygen via the first fluid connector 110b and the liquid connection 310b. The manifolds 306a,b may comprise hollow plastic or metal boxes. The liquid-management section 302 may include a support, such as legs 308 or a pedestal-type support.

An optional separator plate 309, such as a stainless steel plate, may be located on the top of the liquid-management section 302, such that the respective liquid connections 310a, 310b extend through the separator plate. For example, the respective liquid connections 310a, 310b may comprise holes in the separator plate 309 surrounded by respective O-rings.

Referring now to FIG. 2A and FIGS. 3A and 3B, the gas-management section 304 of the electrochemical module 102 may include the electrochemical stack 200, a collector plate 312 and the second fluid connector 112. Thus, stated differently, the liquid-management section 302 and the gas-management section 304 may be separable from one another along low-pressure water connections 110a,b while high-pressure connections 112 associated with the flow of pressurized hydrogen out of the electrochemical module 102 need not be disturbed and, thus, failure modes associated with repeatedly breaking and reestablishing high-pressure connections are not present in the electrochemical module 102. The collector plate 312 may be oriented perpendicular to the direction of the connectors 110a,b and 112 (e.g., out of the page in FIG. 3A).

Figure 4A:
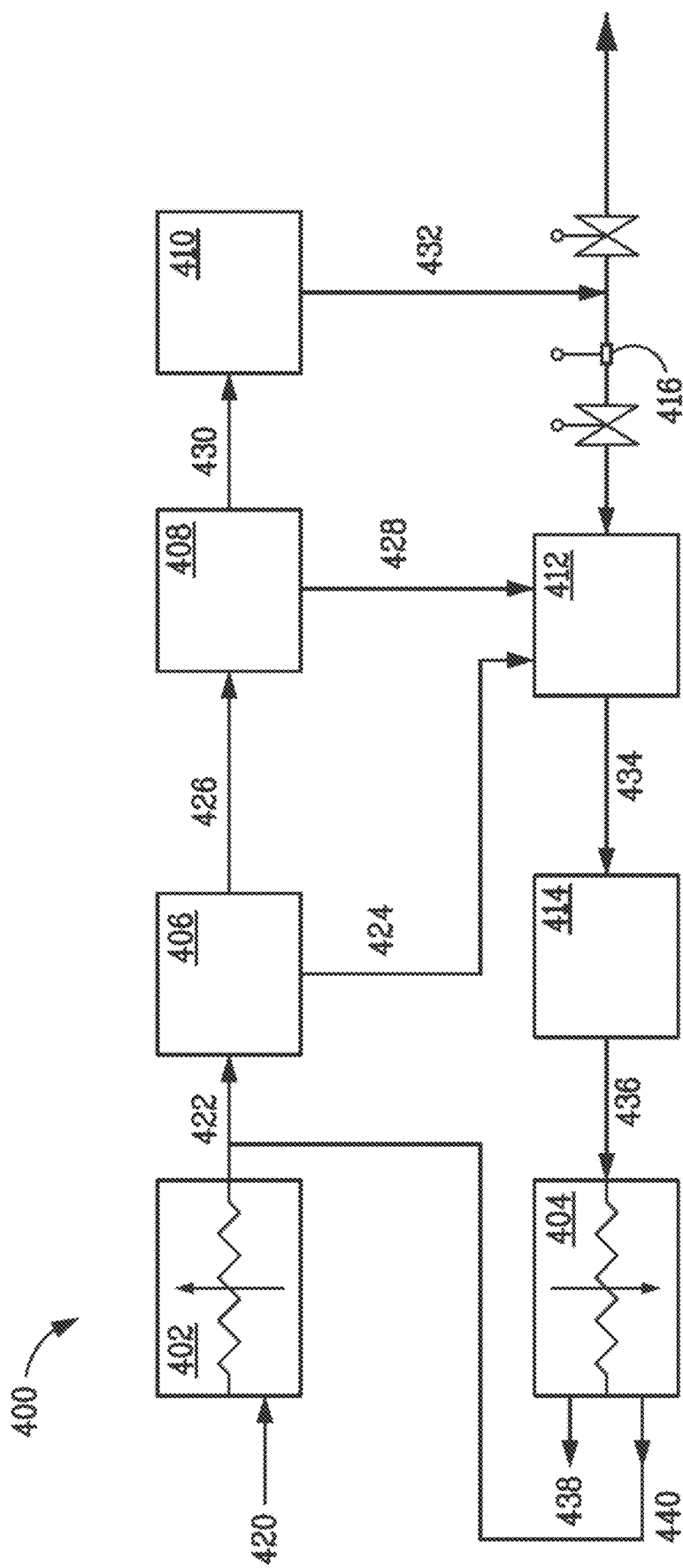
FIGS. 4A and 4B are block diagrams of exemplary systems of the present disclosure.
Figure 4B:
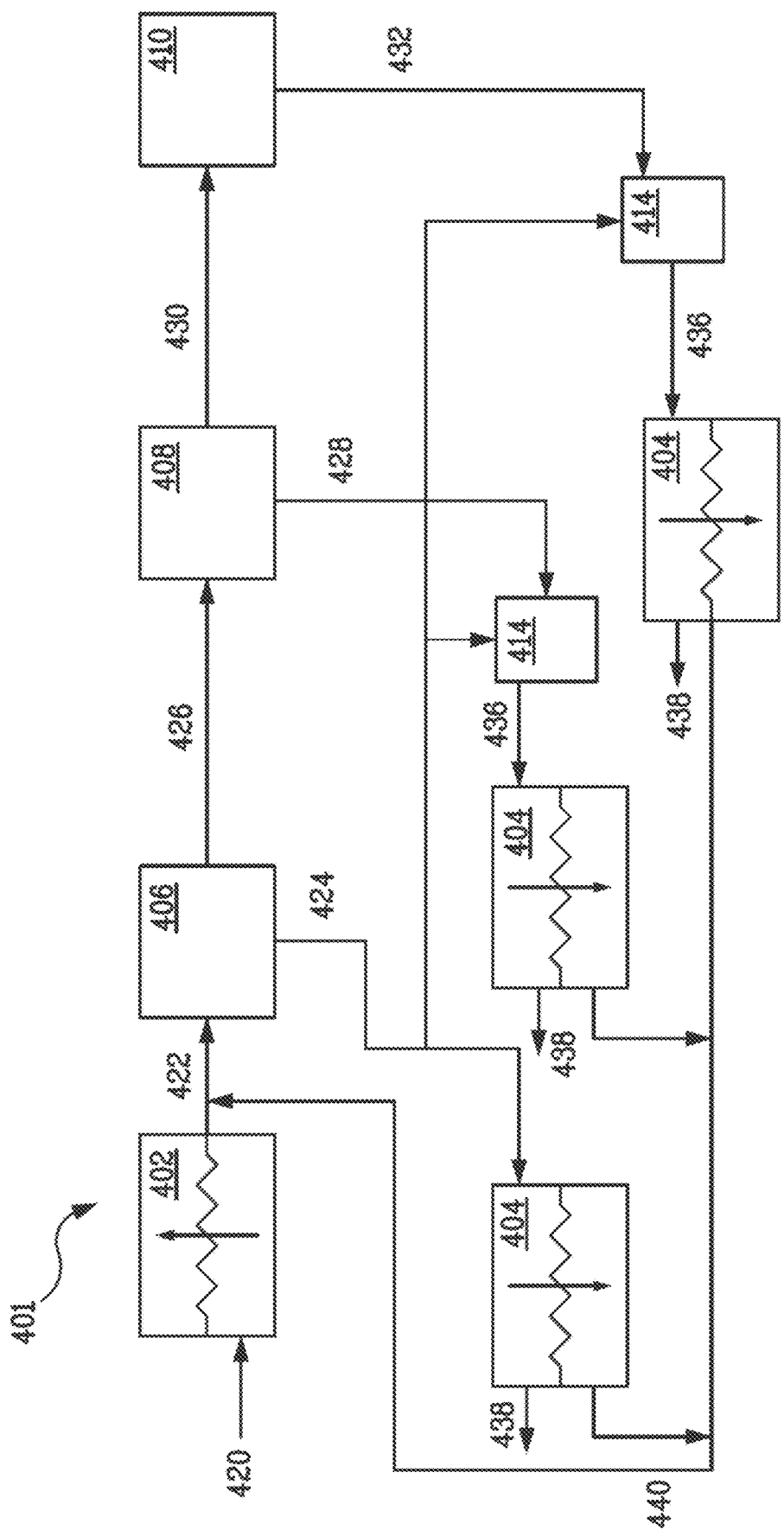

FIGS. 4A and 4B illustrate exemplary systems of the present disclosure. Referring now to FIG. 4A, the system 400 includes an electrolyzer stack 402 which produces hydrogen from water 420. The electrolyzer stack may be any electrolyzer stack described herein. The output wet hydrogen 422 is directed to a dryer 406, which may be any dryer described herein. The dryer removes water from the hydrogen, producing a dry hydrogen stream 426 which is optionally directed to a purifier 408. The purifier 408 removes additional water and other impurities (e.g., oxygen, nitrogen, hydrocarbons, argon, etc.) from the hydrogen gas and provides a purified hydrogen stream 430 to a hydrogen-using application 410, which utilizes the purified hydrogen 430. The hydrogen-using application 410 may be any hydrogen-using device or process, such as a glass float furnace, a metals furnace, or other processes devices requiring hydrogen. The hydrogen-using application 410 may produce exhaust hydrogen 432 which can be directed either to a blending tank 412 to be recycled back into the system 400, or it can be sent to an output stream 442. The output stream 442 may direct the exhaust hydrogen to a scrubber, another process that uses the exhaust hydrogen, or it may be vented to the environment. An oxygen sensor 416 may be provided to determine the oxygen content of the exhaust hydrogen stream 432. Additionally, the system may optionally further include valves and other instrumentation such that if oxygen or other impurities are detected, the exhaust gas 432 may be directed away from the system 400 and not be recycled. The blending tank 412 is operable to mix the exhaust hydrogen stream 432, a purge gas stream 428 from the purifier 408, and purge gas stream 424 from the dryer 406. The purge gas stream 424 and the purge gas stream 428 may each contain a high concentration of water. This forms a blended stream 434 which is directed to a humidifier, forming a humidified stream 436. The humidified stream 436 is directed to a hydrogen pump 404, which produces a purge water stream 438 and a wet hydrogen stream 440. The hydrogen pump 404 may be any hydrogen pump described herein. The wet hydrogen stream 440 is then recycled into the system 400 by directing it to the dryer 406. The wet hydrogen stream 440 may be recombined with the wet hydrogen stream 422 before entering the dryer 406 as shown in FIG. 4A, or the wet hydrogen stream 440 may enter the dryer 406 separately.

The power electronics for the hydrogen pump 404 may be common with the power supply for the electrolyzer stack 402 and are fashioned in a modular way for on-stream service. The hydrogen pump 404 may be operated in constant voltage mode such that it scavenges hydrogen gas when it is present. In another embodiment, the hydrogen pump 404 may be operated at a constant stoichiometry mode wherein the input flows to the hydrogen pump 404 are measured or estimated such that current may be set at an appropriate stoichiometry level.

The hydrogen pump stacks may be capable of repressurizing the wet hydrogen stream 440 to the same pressure as the wet hydrogen stream 422. In one embodiment, a cascade of hydrogen pumps 404 may be used to reduce the fraction of lost hydrogen. Alternatively, a compressor or expander may be included in the system to increase or decrease the pressure of the hydrogen.

The system 400 may further include a heat exchanger to increase or decrease the temperature of the hydrogen. Heat exchangers suitable for use in a system of the present disclosure are well-known to those having ordinary skill in the art. In particular, the heat exchanger may be located downstream from the blending tank 412 and may be operable to increase the temperature of the blended stream 434. The temperature of the blended stream 434 may be increased to a temperature that is optimal for the functioning of the hydrogen pump. In preferred embodiments, the increased temperature of the blended stream 434 may be from about 60° C. to about 80° C.

Referring now to FIG. 4B, the system 401 includes an electrolyzer stack 402 which produces hydrogen from water 420. The electrolyzer stack may be any electrolyzer stack described herein. The output wet hydrogen 422 is directed to a dryer 406, which may be any dryer described herein. The dryer removes water from the hydrogen, producing a dry hydrogen stream 426 which is optionally directed to a purifier 408. The purifier 408 removes additional water and other impurities from the hydrogen gas and provides a purified hydrogen stream 430 to a hydrogen-using application 410, which utilizes the purified hydrogen 430. The hydrogen-using application 410 may be any hydrogen-using device or process, such as a glass float furnace, a metals furnace, or other processes devices requiring hydrogen. The hydrogen-using application 410 may produce exhaust hydrogen 432 which can be directed to a humidifier 414. The humidified hydrogen stream 436a may then be directed to a hydrogen pump 404a, which produces a purge water stream 438a and a wet hydrogen stream 440. The purge water stream 438a is preferably a liquid stream and may contain low levels of hydrogen. Furthermore, a purge gas stream 428 from the purifier 408 is directed to a humidifier 414. The purge gas stream 428 may contain a high concentration of water. The humidified hydrogen stream 436b is then directed to a hydrogen pump 404b, which produces a purge water stream 438b and a wet hydrogen stream 440. The purge water stream 438b is preferably a liquid stream, and may contain low levels of hydrogen. Still further, a purge gas stream 424 from the dryer 406 is directed to one or more hydrogen pumps 404c and/or one or more humidifiers 414. The purge gas stream 424 may contain a high concentration of water.

Further provided herein are methods for recovering hydrogen. The methods may be performed using any system of the present disclosure. The method generally comprises providing a wet hydrogen stream from an electrolyzer to an inlet of a dryer, outputting a dry hydrogen stream from a first outlet of the dryer to a hydrogen-using application, providing a purge wet hydrogen stream from a second outlet of the dryer into the inlet of the dryer, and providing an exhaust hydrogen stream from the hydrogen-using application to the inlet of the dryer.

The method may further comprise providing the exhaust hydrogen stream from the hydrogen-using application to the inlet of the dryer by using one or more pumps. The one or more pumps may be any pump described herein; preferably, the pump is an electrochemical hydrogen pump such as a proton exchange membrane disposed between an anode and a cathode.

The method may further comprise humidifying the exhaust hydrogen stream from the hydrogen-using application before providing the exhaust hydrogen stream from the hydrogen-using application to the inlet of the dryer. The humidifying may be accomplished via a humidifier, including any humidifier described herein or known to those having ordinary skill in the art. The method may further comprise humidifying the combined exhaust hydrogen stream from the hydrogen-using application and the purge wet hydrogen stream from the second outlet of the dryer prior to providing the exhaust hydrogen stream from the hydrogen-using application and the purge wet hydrogen stream from the second outlet of the dryer to the inlet of the dryer.

The method may further comprise purifying the dry hydrogen stream from the first outlet of the dryer. The purifying may be accomplished via a purifier, including any purifier described herein or known in the art. The purifying may comprise outputting a purified hydrogen stream from a first outlet of the purifier. The purifying is operable to produce a stream of purified hydrogen from an outlet in the purifier. The purifying may occur before outputting the dry hydrogen stream from the first outlet of the dryer to the hydrogen-using application. The method may further comprise humidifying a purge wet hydrogen stream from an outlet of the purifier by using a humidifier.

The method may further comprise combining the exhaust hydrogen stream from the hydrogen-using application and the purge wet hydrogen stream from the second outlet of the dryer. Additionally, the method may also further comprise combining the exhaust hydrogen stream from the hydrogen-using application, the purge wet hydrogen stream from the second outlet of the dryer, and a purge wet hydrogen stream from a second outlet of the purifier. The combining may be accomplished by using a blending tank described herein or known to those having ordinary skill in the art.

As used herein, "wet hydrogen" refers to hydrogen that is saturated with water. Those having ordinary skill in the art will appreciate that the amount and/or concentration of water in the wet hydrogen will depend on the temperature and pressure of the wet hydrogen.

As used herein, "dry hydrogen" refers to hydrogen that has a water content of about 10 ppm or less. For example, the dry hydrogen may have a water content of about 10 ppm, about 9 ppm, about 8 ppm, about 7 ppm, about 6 ppm, about 5 ppm, about 4 ppm, about 3 ppm, about 2 ppm, about 1 ppm, or less than about 1 ppm. Preferably, the dry hydrogen has a water content of about 5 ppm or less.

As used herein, "purified hydrogen" refers to hydrogen that is at least about 99.99% pure on a mol percent basis. In some embodiments, the purified hydrogen may be 99.999% pure on a mol percent basis. Similarly, "impure hydrogen" as used herein refers to hydrogen that has not been purified and does not meet the definition of "purified hydrogen" as set forth above.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system for hydrogen recovery comprising:
    a dryer comprising an inlet that may be fluidly connected to a hydrogen generator comprising an electrolyzer stack, wherein the dryer is a pressure swing adsorption (PSA) dryer, a temperature swing adsorption (TSA) dryer or a hybrid PSA-TSA dryer;
    a hydrogen-using application comprising an inlet fluidly connected to a dry hydrogen outlet of the dryer and an outlet fluidly connected to the inlet of the dryer, such that a hydrogen exhaust stream from the outlet of the hydrogen-using application is recirculated to the inlet of the dryer.

2. The system of claim 1, further comprising one or more pumps fluidly connected to the dryer, the hydrogen generator, the hydrogen-using application, or a combination thereof.

3. The system of claim 2, each of the one or more pumps comprising an inlet fluidly connected to the hydrogen-using application and an outlet fluidly connected to the inlet of the dryer.

4. The system of claim 2, further comprising one or more humidifiers fluidly connected to the dryer.

5. The system of claim 4, each of the one or more humidifiers comprising an inlet and an outlet, the outlet fluidly connected to the one or more pumps.

6. The system of claim 2, further comprising a purifier fluidly connected to the dryer.

7. The system of claim 6, the purifier comprising an inlet fluidly connected to the dry hydrogen outlet of the dryer and an outlet fluidly connected to the inlet of the hydrogen-using application.

8. The system of claim 1, further comprising at least one oxygen sensor.

9. The system of claim 1, the dryer further comprising a wet hydrogen outlet fluidly connected to the inlet of the dryer.

10. The system of claim 3, the dryer further comprising a wet hydrogen outlet fluidly connected to the inlet of at least one of the one or more pumps.

11. The system of claim 1, further comprising a blending tank.

12. The system of claim 11, the blending tank comprising an inlet fluidly connected to the outlet of the hydrogen-using application.

13. The system of claim 1, further comprising an electrochemical hydrogen pump in fluid communication between the dry hydrogen outlet of the dryer and the inlet of the dryer.

* * * * *